United States Patent
Nam et al.

(10) Patent No.: US 8,259,643 B2
(45) Date of Patent: Sep. 4, 2012

(54) APPARATUS AND METHOD FOR CODEWORD TO LAYER MAPPING IN MIMO TRANSMISSION WIRELESS SYSTEMS

(75) Inventors: Young-Han Nam, Richardson, TX (US); Jianzhong Zhang, Irving, TX (US); Juho Lee, Gyeonggi (KR); Jin-Kyu Han, Seoul (KR); Zhouyue Pi, Richardson, TX (US); Farooq Khan, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 411 days.

(21) Appl. No.: 12/689,147

(22) Filed: Jan. 18, 2010

(65) Prior Publication Data

US 2010/0208680 A1 Aug. 19, 2010

Related U.S. Application Data

(60) Provisional application No. 61/207,560, filed on Feb. 13, 2009, provisional application No. 61/208,181, filed on Feb. 20, 2009.

(51) Int. Cl.
*H04B 7/204* (2006.01)
*H04B 7/208* (2006.01)
*H04W 4/00* (2009.01)
*H04J 3/16* (2006.01)
*H04N 7/12* (2006.01)

(52) U.S. Cl. ........ 370/319; 370/334; 370/344; 370/437; 375/240.02

(58) Field of Classification Search .......... 370/203–210, 370/310–350, 431, 437–443, 464–465, 479; 375/240.03, 240.16, 240.12, 240.23; 712/1, 712/18, 29, 200, 208–209, 300; 714/752–759, 714/770–774, 781–785

See application file for complete search history.

(56) References Cited

U.S. PATENT DOCUMENTS

| | | | |
|---|---|---|---|
| 8,064,394 B2 * | 11/2011 | Jongren et al. | 370/329 |
| 2003/0192004 A1 | 10/2003 | Gopalakrishnan | |
| 2008/0098273 A1 | 4/2008 | Blankenship et al. | |
| 2010/0067512 A1 * | 3/2010 | Nam et al. | 370/342 |
| 2010/0077274 A1 * | 3/2010 | Kim et al. | 714/750 |
| 2010/0303016 A1 * | 12/2010 | Jin et al. | 370/328 |
| 2011/0299383 A1 * | 12/2011 | Ko et al. | 370/210 |
| 2012/0087346 A1 * | 4/2012 | Lee et al. | 370/335 |

OTHER PUBLICATIONS

International Search Report dated Aug. 2, 2010 in connection with International Patent Application No. PCT/KR2010/000900.

* cited by examiner

Primary Examiner — Tri H Phan

(57) ABSTRACT

A mobile station capable of communicating via an uplink transmission to at least one base station in a Multiple Input Multiple Output wireless network can map codewords to a plurality of layers. The mobile station includes a plurality of transmit antenna and a controller coupled to the plurality of transmit antenna. The controller is configured to map at least one codeword to a plurality of layers. The codeword includes a plurality of code blocks. The controller is configured to generate the plurality of code blocks from a transport block such that the number of code blocks generated correspond to an integer multiple of a number the plurality of layers.

20 Claims, 21 Drawing Sheets

APPARATUS AND METHOD FOR CODEWORD TO LAYER MAPPING IN MIMO TRANSMISSION WIRELESS SYSTEMS

CROSS-REFERENCE TO RELATED APPLICATIONS AND CLAIM OF PRIORITY

The present application is related to U.S. Provisional Patent No. 61/207,560, filed Feb. 13, 2009, entitled "MIMO TRANSMISSION IN WIRELESS SYSTEMS" and to U.S. Provisional Patent No. 61/208,181, filed Feb. 20, 2009, entitled "SPATIAL MULTIPLEXING AND TRANSMIT DIVERSITY IN MIMO WIRELESS COMMUNICATION SYSTEMS". Provisional Patent Nos. 61/207,560 and 61/208,181 are assigned to the assignee of the present application and are hereby incorporated by reference into the present application as if fully set forth herein. The present application hereby claims priority under 35 U.S.C. §119(e) to U.S. Provisional Patent Nos. 61/207,560 and 61/208,181.

TECHNICAL FIELD OF THE INVENTION

The present application relates generally to wireless communications networks and, more specifically, to data and control signal transmissions in a wireless communication network.

BACKGROUND OF THE INVENTION

Modern communications demand higher data rates and performance. Multiple input, multiple output (MIMO) antenna systems, also known as multiple-element antenna (MEA) systems, achieve greater spectral efficiency for allocated radio frequency (RF) channel bandwidths by utilizing space or antenna diversity at both the transmitter and the receiver, or in other cases, the transceiver.

In MIMO systems, each of a plurality of data streams is individually mapped and modulated before being precoded and transmitted by different physical antennas or effective antennas. The combined data streams are then received at multiple antennas of a receiver. At the receiver, each data stream is separated and extracted from the combined signal. This process is generally performed using a minimum mean squared error (MMSE) or MMSE-successive interference cancellation (SIC) algorithm.

SUMMARY OF THE INVENTION

A mobile station capable of communicating via an uplink transmission to at least one base station in a wireless network is provided. The mobile station includes a plurality of transmit antenna and a controller coupled to the plurality of transmit antenna. The controller is configured to map at least one codeword to an $N_L$ number of layers. The codeword includes a plurality of code blocks. The controller is configured to generate the plurality of code blocks from a transport block such that a number of the plurality of code blocks generated is equal to $k \times N_L$, wherein k is an integer value.

A method for codeword to layer mapping in a wireless network is provided. The method includes receiving a transport block comprising a plurality of information bits. At least one codeword for mapping onto $N_L$ number of layers is generated. The at least one codeword includes a plurality of code blocks. Generating the at least one codeword includes generating the plurality of code blocks such that a number of the plurality of code blocks generated is equal to $k \times N_L$, wherein k is an integer value, where k is an integer value. The method also includes mapping the at least one codeword onto the $N_L$ number of layers.

A transmission apparatus for use in a mobile station capable of communicating via an uplink transmission to at least one base station in a wireless network is provided. The transmission apparatus includes a transceiver coupled to a plurality of transmit antenna and a controller coupled to the transceiver. The controller is configured to map at least one codeword to an $N_L$ number of layers. The codeword includes a plurality of code blocks. The controller is configured to generate the plurality of code blocks from a transport block such that a number of the plurality of code blocks generated is equal to $k \times N_L$.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network.

With regard to the following description, it is noted that the 3GPP Long Term Evolution (LTE) term "node B" is another term for "base station" used below. Also, the LTE term "user equipment" or "UE" is another term for "subscriber station" (or "SS") used below.

Figure 1:
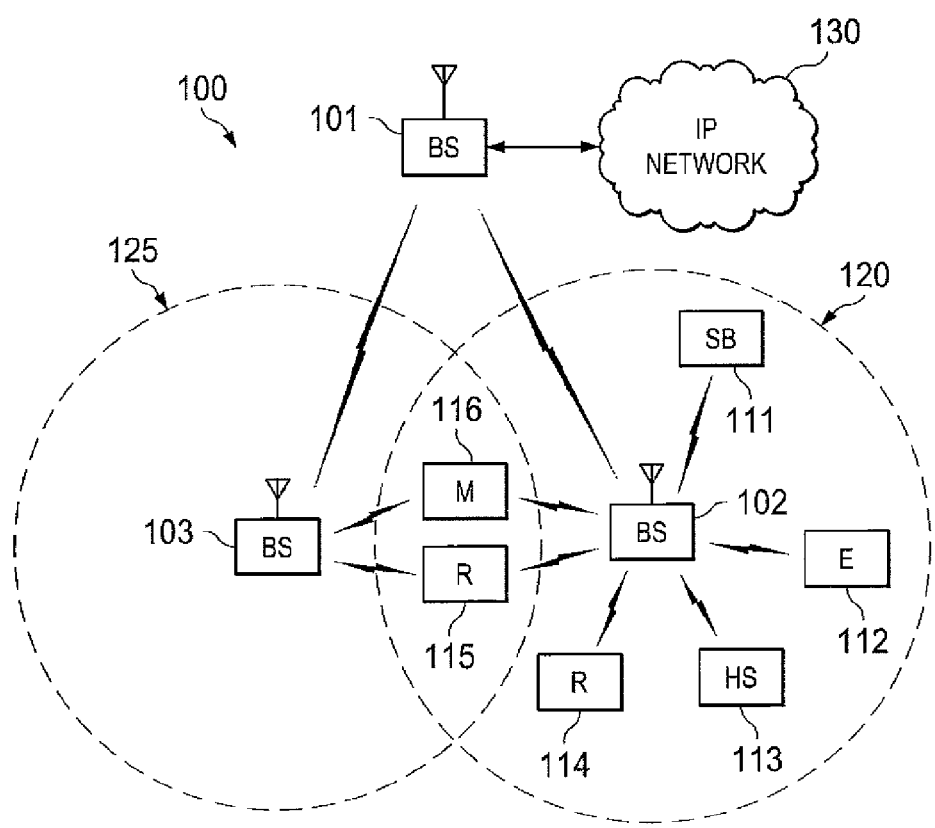
FIG. 1 illustrates an Orthogonal Frequency Division Multiple Access (OFDMA) wireless network that is capable of decoding data streams according to one embodiment of the present disclosure.

FIG. 1 illustrates exemplary wireless network 100 that is capable of decoding data streams according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber station (SS) may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in handoff mode, as known to those of skill in the art.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

In accordance with an embodiment of the present disclosure, one or more of base stations 101-103 and/or one or more of subscriber stations 111-116 comprises a receiver that is operable to decode a plurality of data streams received as a combined data stream from a plurality of transmit antennas using an MMSE-SIC algorithm. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Figure 2:
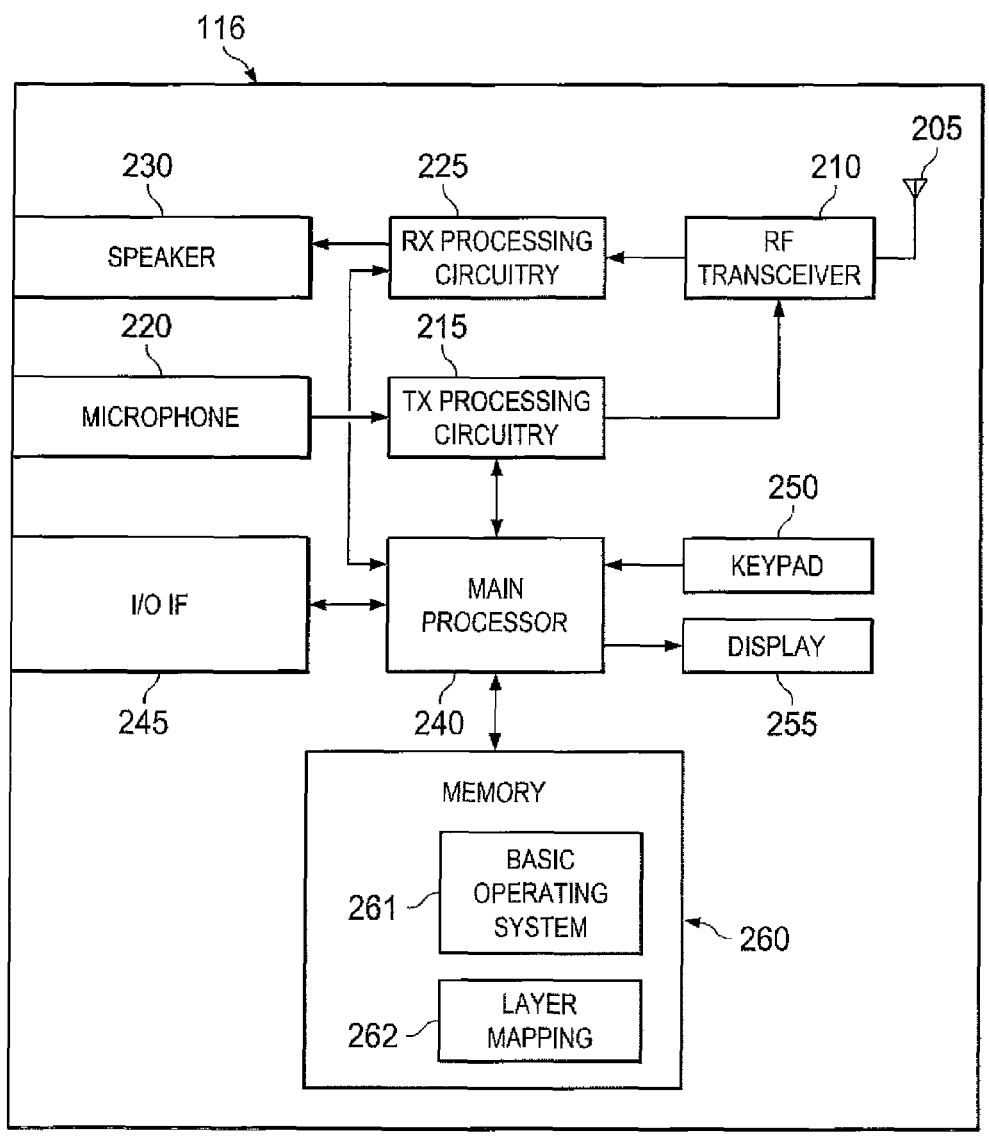
FIG. 2 illustrates an exemplary wireless mobile station according to embodiments of the present disclosure.

FIG. 2 illustrates an exemplary wireless subscriber station according to embodiments of the present disclosure. The embodiment of wireless subscriber station 116 illustrated in FIG. 2 is for illustration only. Other embodiments could be used without departing from the scope of this disclosure.

Wireless subscriber station 116 comprises antenna 205, radio frequency (RF) transceiver 210, transmit (TX) processing circuitry 215, microphone 220, and receive (RX) processing circuitry 225. SS 116 also comprises speaker 230, main processor 240, input/output (I/O) interface (IF) 245, keypad 250, display 255, and memory 260. Memory 260 further comprises basic operating system (OS) program 261 and, in some embodiments, a layer mapping process block 262.

Radio frequency (RF) transceiver 210 receives, from antenna 205, an incoming RF signal transmitted by a base station of wireless network 100. Antenna 205 can comprise a number (Nt) of antenna 205 (e.g., SS 116 includes Nt antenna 205). Radio frequency (RF) transceiver 210 down-converts the incoming RF signal to produce an intermediate frequency (IF) or a baseband signal. The IF or baseband signal is sent to receiver (RX) processing circuitry 225 that produces a processed baseband signal by filtering, decoding, and/or digitizing the baseband or IF signal. Receiver (RX) processing circuitry 225 transmits the processed baseband signal to speaker 230 (that is, voice data) or to main processor 240 for further processing (such as, web browsing).

Transmitter (TX) processing circuitry 215 receives analog or digital voice data from microphone 220 or other outgoing baseband data (such as, web data, e-mail, interactive video game data) from main processor 240. Transmitter (TX) processing circuitry 215 encodes, multiplexes, and/or digitizes the outgoing baseband data to produce a processed baseband or IF signal. Radio frequency (RF) transceiver 210 receives the outgoing processed baseband or IF signal from transmitter (TX) processing circuitry 215. Radio frequency (RF) transceiver 210 up-converts the baseband or IF signal to a radio frequency (RF) signal that is transmitted via antenna 205.

In some embodiments of the present disclosure, main processor 240 is a microprocessor or microcontroller. Memory 260 is coupled to main processor 240. According to some embodiments of the present disclosure, part of memory 260 comprises a random access memory (RAM) and another part of memory 260 comprises a Flash memory, which acts as a read-only memory (ROM).

Main processor 240 executes basic operating system (OS) program 261 stored in memory 260 in order to control the overall operation of wireless subscriber station 116 such as one or more of the functions disclosed herein including code-block segmentation and/or layer mapping. In some embodiments, main processor 240 executes instructions stored in layer mapping block 262 to perform the functions disclosed herein including code-block segmentation, layer mapping, or both. In one such operation, main processor 240 controls the reception of forward channel signals and the transmission of reverse channel signals by radio frequency (RF) transceiver 210, receiver (RX) processing circuitry 225, and transmitter (TX) processing circuitry 215, in accordance with well-known principles.

Main processor 240 is capable of executing other processes and programs resident in memory 260. Main processor 240 can move data into or out of memory 260, as required by an executing process. Main processor 240 is also coupled to I/O interface 245. I/O interface 245 provides subscriber station 116 with the ability to connect to other devices such as laptop computers and handheld computers. I/O interface 245 is the communication path between these accessories and main controller 240.

Main processor 240 is also coupled to keypad 250 and display unit 255. The operator of subscriber station 116 uses keypad 250 to enter data into subscriber station 116. Display 255 may be a liquid crystal display capable of rendering text and/or at least limited graphics from web sites. Alternate embodiments may use other types of displays.

Figure 3:
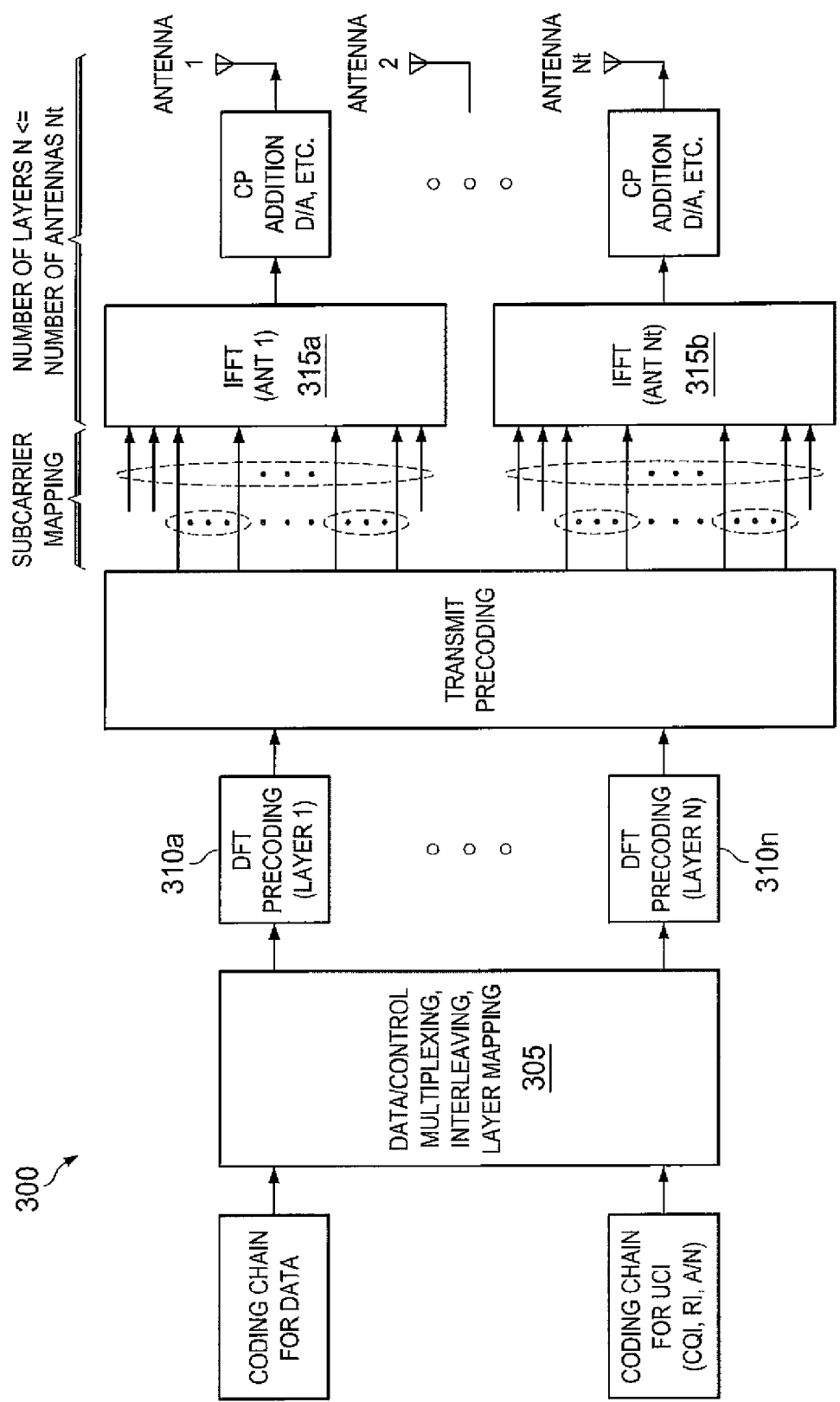
FIG. 3 illustrates an uplink transmission chain for Nt transmit antenna for N layer transmissions according to embodiments of the present disclosure.

FIG. 3 illustrates an uplink transmission chain for Nt transmit antenna for N layer transmissions according to embodiments of the present disclosure. The embodiment of the uplink transmission chain 300 shown in FIG. 3 is for illustration only. Other embodiments could be used without departing from the scope of this disclosure.

The uplink transmission chain 300 is operable to provide a generic N layer transmission when SS 116 includes Nt transmit antenna. The uplink transmission chain 300 includes a Data/Control Multiplexing, interleaving layer mapping block 305 (herein after referred to as layer mapping 305). The layer mapping 305 is performed before DFT precoding 310, so that the data and control information are properly multiplexed and interleaved. The transmit precoding is performed between the DFT precoders 310a-310n and IFFTs 315a-315b to transform, on a per-subcarrier basic, an N dimension signal at the output of the DFT precoders 310a-310n to an Nt dimensional signal as an input to the group of IFFTs 315a-315b. The subcarrier mapping at the input of IFFTs can include non-contiguous segments of subcarriers.

Figure 4:
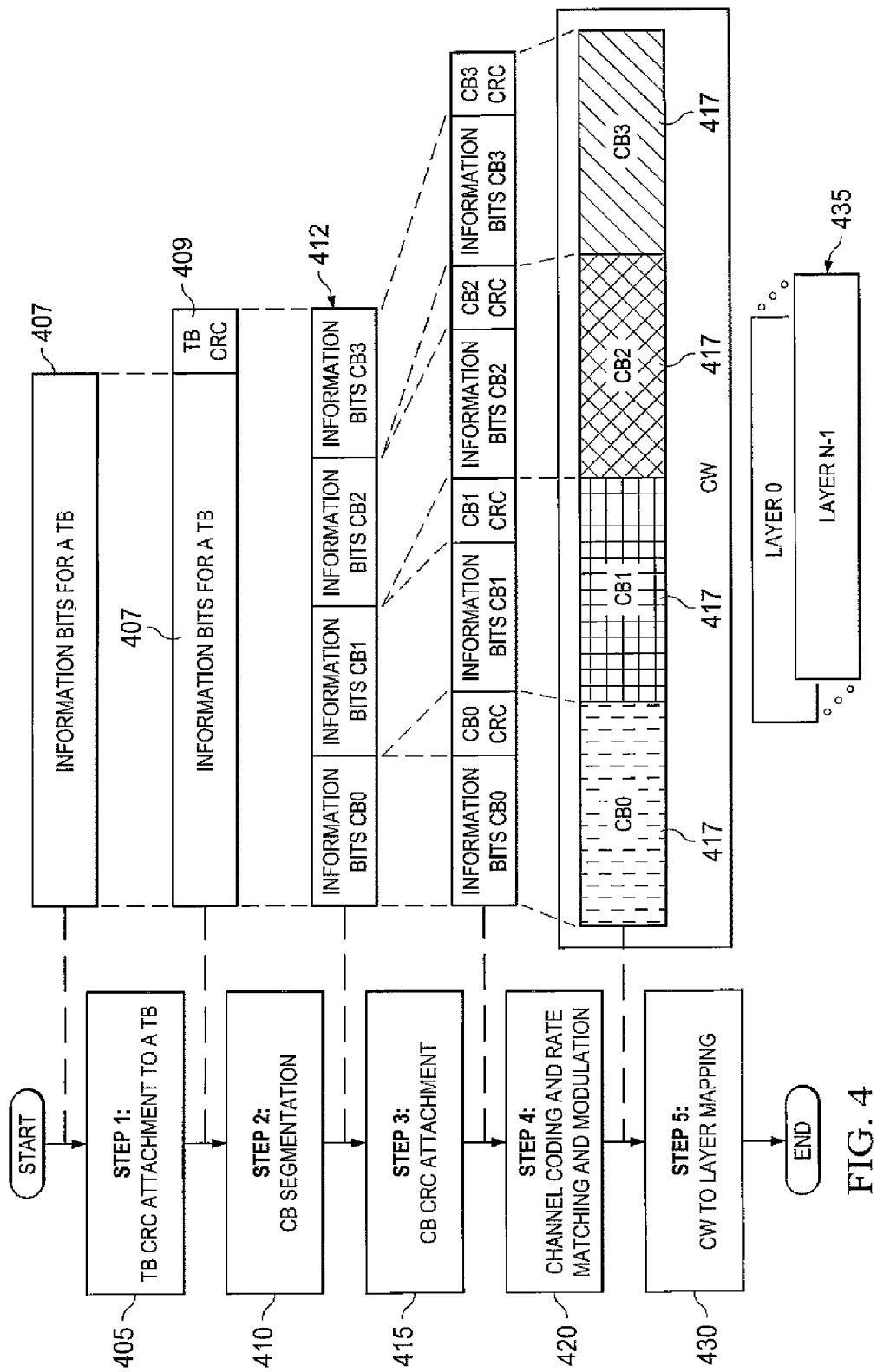
FIG. 4 illustrates an example coding chain and codeword to layer mapping.

FIG. 4 illustrates an example coding chain and codeword to layer mapping. The coding chain and codeword to layer mapping 400 shown in FIG. 4 corresponds to a partial transmitter structure further described in 3GPP TS 36.212 v 8.5.0, "E-Utra, Multiplexing and Channel Coding", December 2008, the contents of which hereby are incorporated by reference in its entirety.

The transport channel 400 includes a Transport Block (TB) Cyclic Redundancy Check (CRC) Attachment block 405. The Transport Block (TB) Cyclic Redundancy Check (CRC) Attachment block 405 receives information bits for a TB 407. The TB CRC block 405 performs error detection on Uplink-Shared Channel (UL-SCH) transport blocks through a CRC. The entire TB can be used to calculate the CRC parity bits. Thus, a TB CRC 409 is added to TB 407 (which includes a plurality of information bits). Thereafter, a code block (CB)

segmentation block 410 segments the input bit sequence (including the TB 407 and TB CRC 409) into a number of CBs 412a-412n if a number of bits is larger than a maximum code block size. A total number of code blocks (CB's) 412 from the CB segmentation block 410 is determined by Equation 1:

$$C=\lceil B/(Z-L)\rceil \quad [\text{Eqn. 1}]$$

In equation 1, C is the number of code blocks; B is the number of input sequence bits; Z is the maximum code block size; and L is a number of bits for an additional CRC sequence. A CB CRC attachment block 415 can attach the additional CRC sequence (such as L=24 bits) to each CB info bit 412 to create code blocks 417.

The transport channel 400 also includes a channel coding block and rate matching block 420 for coding of data and control information. Code blocks 417, from the code block segmentation and code block CRC attachment 415, are delivered to the channel coding block and rate matching block 420. Each code block 417a-417n can be individually turbo encoded and can be individually rate matched to generate codewords 425. The codewords 425 output from the channel coding block and rate matching block 420 are delivered to codeword to layer mapping block 430. The codeword to layer mapping block 430 then maps the codewords 425 to a number of layers 435. The codeword to layer mapping is disclosed further in 3GPP TS 36.211 v 8.5.0, "E-UTRA, Physical channels and modulation", December 2008, the contents of which hereby are incorporated by reference in its entirety.

Figure 5A:
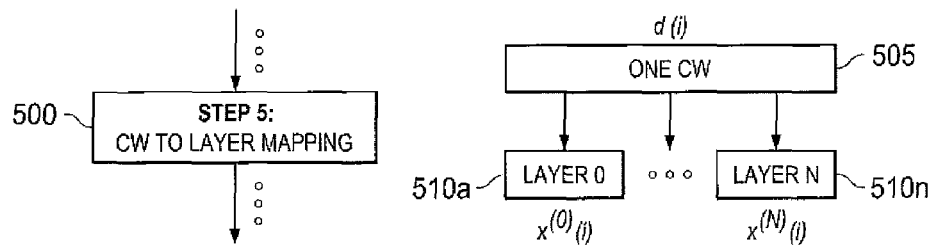
FIGS. 5A through 5B illustrate codeword to layer mapping according to embodiments of the present disclosure.
Figure 5B:
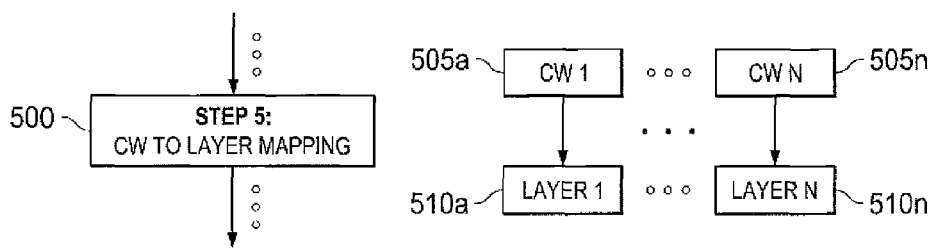

FIGS. 5A through 5B illustrate codeword to layer mapping according to embodiments of the present disclosure. The embodiments shown in FIGS. 5A through 5B are for illustration only. Other embodiments could be used without departing from the scope of this disclosure.

The codeword to layer mapping block 430 in the transport channel 400 can be replaced by new codeword to layer mapping block 500 that is configured to map a codeword according to one of two mapping structures. In the example illustrated in FIG. 5A, one codeword 505 is mapped to multiple layers 510a-510n. In the example illustrated in FIG. 5A, multiple codewords 505 are each mapped to a respective layers 510 such that, a first codeword 505a is mapped to a first layer 510a and an $n^{th}$ codeword 505n is mapped to an $n^{th}$ layer 510n. Multiple codewords 505 can be transmitted from a first terminal to another terminal in a subframe, such as from SS 116 to BS 102 or from BS 102 to SS 116. Depending upon the available number of layers 510 in the transmission, each codeword 505a-505n can be partitioned and distributed into one or more layers according to either of the mapping structures illustrated in FIGS. 5A and 5B.

Figure 6:
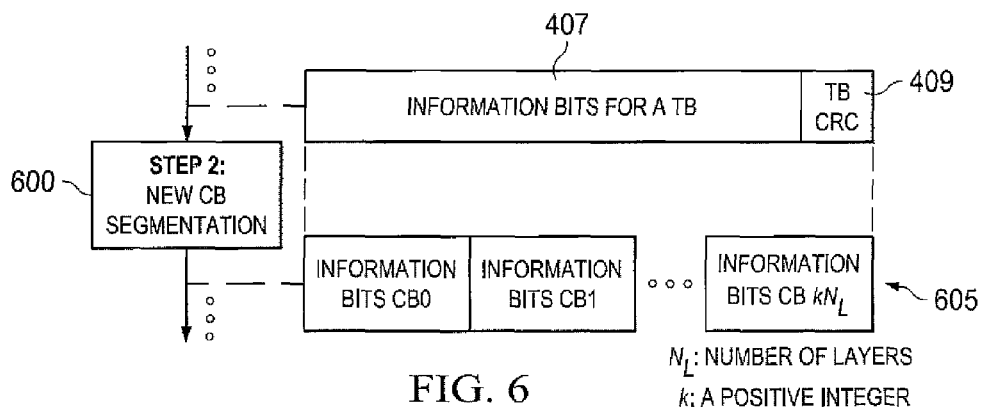
FIG. 6 illustrates a new codebook segmentation block according to embodiments of the present disclosure.

FIG. 6 illustrates a new codebook segmentation block 600 according to embodiments of the present disclosure. The embodiment shown in FIG. 6 is for illustration only. Other embodiments could be used without departing from the scope of this disclosure.

The CB segmentation block 410 in the transport channel 400 can be replaced by new CB segmentation block 600. The new CB segmentation block 600 receives the input bit sequence (including the TB 407 and TB CRC 409). The new CB segmentation block 600 generates a number of CB's 605 (that is, a quantity or CB's 605) corresponding to a multiple of the number of layers to which a codeword (CW) will be mapped. For example, the number (e.g., quantity) of generated CB's is always an integer (k) multiple of the number of layers ($N_L$) to which a codeword (or TB at the higher layer) will be mapped such that the number is CB's generated is based on $k \cdot N_L$. A total number of CB's 605 from the new CB segmentation block 600 can be determined by Equation 2 and Equation 3:

$$C=N_L \lceil C'/N_L \rceil \quad [\text{Eqn. 2}]$$

where $$C'=\lceil B/(Z-L) \rceil \quad [\text{Eqn. 3}]$$

In Equation 2 and Equation 3, C is the number (e.g., quantity) of code blocks; $N_L$ is the number (e.g., quantity) of layers onto which the code blocks will be mapped; Z is the maximum code block size; B is the number of input sequence bits; and L is a number of bits for the additional CRC sequence.

Figure 7A:
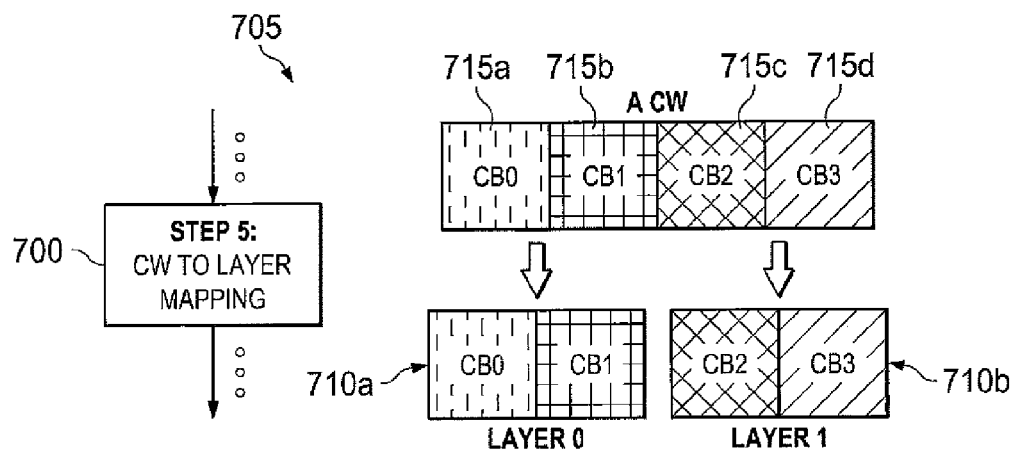
FIGS. 7A through 7C illustrate codeword to layer and codeword to resource element mapping according to embodiments of the present disclosure.
Figure 7B:
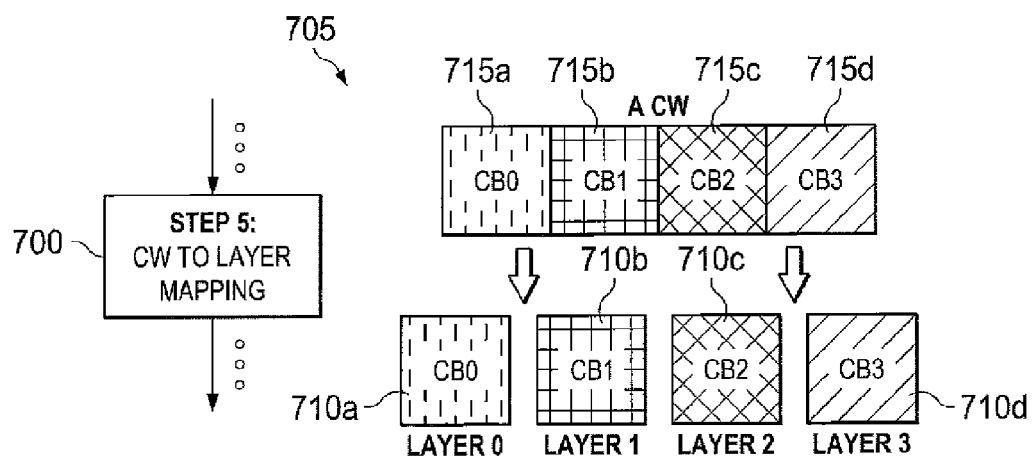

Additionally, when mapped to the layers, such as by using CW-layer mapping discussed herein below with respect to FIGS. 7A through 7C, the CBs 605 (that is, the $K \cdot N_L$ CB's 605) can be mapped onto $N_L$ layers such that each layer includes a "K" number of CBs 605. For example, as illustrated in FIG. 7A, when K=2 and $N_L$=2, the number of CB's 605 in one CW 705 is four (that is, $K \cdot N_L$=4). Additionally, as illustrated in FIG. 7B, when K=1 and $N_L$=4, the number of CB's 605 in one CW 705 also is four (that is, $K \cdot N_L$=4). In another example, as illustrated in FIG. 8C, each CW 805a-805b is mapped to four layers, 810a-810d and 810e-810h, and when K=1 and $N_L$=4, the number of CB's 605 in each CW 805a-805b is four (that is, $K \cdot N_L$=4).

Figure 7C:
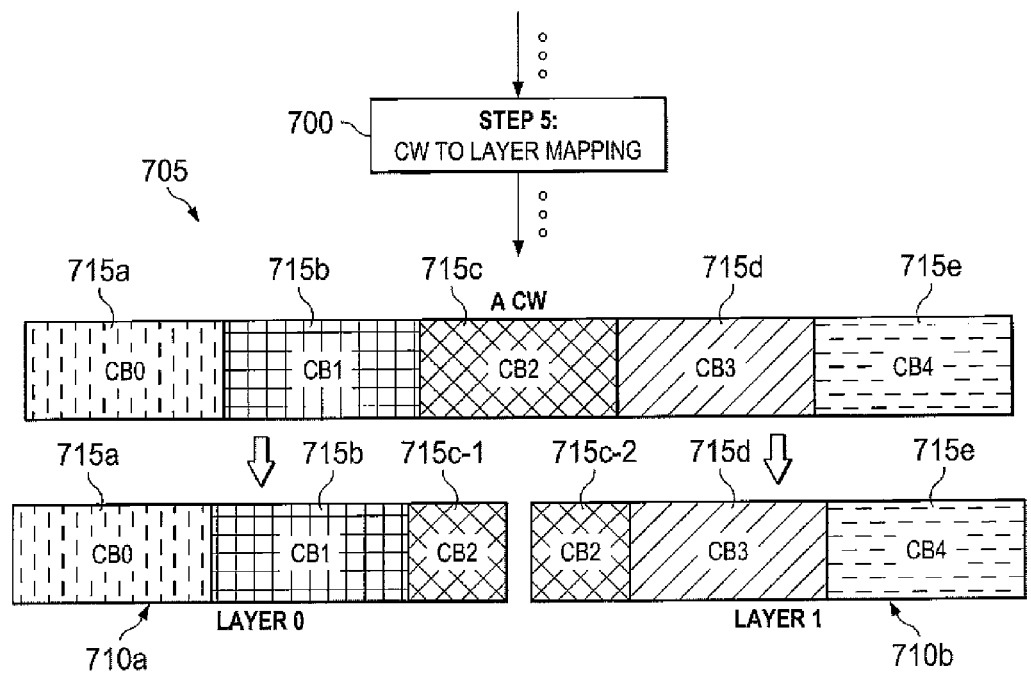

FIGS. 7A through 7C illustrate codeword to layer and codeword to resource element mapping according to embodiments of the present disclosure. The embodiments shown in FIGS. 7A through 7C are for illustration only. Other embodiments could be used without departing from the scope of this disclosure.

The codeword to layer mapping block 430 in the transport channel 400 can be replaced by new CW-layer mapping block 700. The new CW-layer mapping block 700 can map a codeword depending upon whether the number of CBs in a CW is an integer multiple of the number of layers as illustrated in FIGS. 7A and 7B or not an integer multiple of the number of layers as illustrated in FIG. 7C.

In a first mapping method, the new CW-layer mapping block 700 maps CWs to layers in a layer first manner such that consecutive symbols in a CW are mapped to one layer first. For example, the CW-layer mapping block 700 maps the first $\lceil M_{symb}^{(0)}/N_L \rceil$ modulated symbols in a CW 705 to the first layer 710a, the second $\lceil M_{symb}^{(0)}/N_L \rceil$ symbols to the second layer 710b, and so forth.

Additionally, denoting the modulated symbols in a CW by $\{d^{(0)}(i)\}$, where i=0, ..., $M_{symb}^{(0)}-1$, the Modulation symbols $\{d^{(0)}(i)\}$ in a CW 705 can be partitioned into $N_L$ groups of consecutive symbols, where the symbols in $i^{th}$ group are mapped onto $i^{th}$ layer. When $M_{symb}^{(0)}$ is not divisible by $N_L$, null symbols can be appended to $d^{(0)}(M_{symb}^{(0)}-1)$ so that all the layers 710 include an equal number of symbols, $M_{symb}^{layer}$. The mapping methods can be constructed as defined in Equations 4 through 7, where i=0, ..., $M_{symb}^{layer}-1$:

With $N_L=2$:

$$\begin{cases} x^{(0)}(i) = d^{(0)}(i) \\ x^{(1)}(i) = d^{(0)}(i + M_{symb}^{layer}), \end{cases} \quad [\text{Eqn. 4}]$$

where $M_{symb}^{layer} = M_{symb}^{(0)}/2$.

With $N_L=3$:

$$\begin{cases} x^{(0)}(i) = d^{(0)}(i) \\ x^{(1)}(i) = d^{(0)}(i + M_{symb}^{layer}) \\ x^{(2)}(i) = d^{(0)}(i + 2M_{symb}^{layer}), \end{cases} \quad [\text{Eqn. 5}]$$

where $M_{symb}^{layer} = \lceil M_{symb}^{(0)}/3 \rceil$. If $M_{symb}^{(0)}$ mod 3=1, then two null symbols are appended to $d^{(0)}(M_{symb}^{(0)}-1)$. If $M_{symb}^{(0)}$ mod 3=2, then one null symbol are appended to $d^{(0)}(M_{symb}^{(0)}-1)$.

With $N_L=4$:

$$\begin{cases} x^{(0)}(i) = d^{(0)}(i) \\ x^{(1)}(i) = d^{(0)}(i + M_{symb}^{layer}) \\ x^{(2)}(i) = d^{(0)}(i + 2M_{symb}^{layer}) \\ x^{(3)}(i) = d^{(0)}(i + 3M_{symb}^{layer}), \end{cases}$$ [Eqn. 6]

where $$M_{symb}^{layer} = \begin{cases} M_{symb}^{(0)}/4 & \text{if } M_{symb}^{(0)} \bmod 4 = 0 \\ (M_{symb}^{(0)} + 2)/4 & \text{if } M_{symb}^{(0)} \bmod 4 \neq 0 \end{cases}$$ [Eqn. 7]

If $M_{symb}^{(0)} \bmod 4 \neq 0$ two null symbols are appended to $d^{(0)}(M_{symb}^{(0)}-1)$.

With a general $N_L$, $x^{(p)}(i) = d^{(0)}(i + hM_{symb}^{layer})$ (it is noted that some forms of this equation use "l" instead of "h"), where $$M_{symb}^{layer} = \left\lceil \frac{M_{symb}^{(0)}}{N_L} \right\rceil.$$

When $M_{symb}^{(0)} \bmod N_L \neq 0$, an appropriate number of null symbols are appended to $d^{(0)}(M_{symb}^{(0)}-1)$ so that all the $N_L$ layers have $M_{symb}^{layer}$ symbols.

As illustrated in the examples in FIGS. 7A and 7B, the number of CBs 715 in a CW 705 is an integer multiple of the number of layers 710. In these examples, all the symbols in a CB 715 are mapped in only one layer 710. Additionally, each layer 710*a*-710*d* includes an equal number of CBs 715.

For example, as illustrated in FIG. 7A, the CW 705 includes four (4) CBs 715*a*-715*d* to be mapped to two layers 710*a*-710*b*. The new CW-layer mapping block 700 maps the first CB, CB0 715*a*, and second CB, CB1 715*b*, to the first layer, Layer0 710*a*. The new CW-layer mapping block 700 also maps the third CB, CB2 715*c*, and fourth CB, CB3 715*d*, to the second layer, Layer1 710*b*.

In the example in FIG. 7B, the CW 705 includes four (4) CBs 715*a*-715*d* to be mapped to two layers 710*a*-710*b*. The new CW-layer mapping block 700 maps CB0 715*a* to Layer0 710*a*, CB1 715*b* to Layer1 710*b*, CB2 715*c* to the third layer, Layer2 710*c*, and CB3 715*d* to the fourth layer, Layer3 710*d*.

In the example illustrated in FIG. 7C, the number of CBs 715 in the CW 705 is not an integer multiple of the number of layers 710. At least one CB 715 can be broken into portions and mapped to multiple layers 710. For example, CW 705 includes five CBs, CB0 715*a*, CB1 715*b*, CB2 715*c*, CB3 715*d* and CB4 715*e*. The CBs 715*a*-715*e* are mapped to two layers 710*a*-710*b*. Therefore, the number of CBS is not an integer multiple of the number of layers (that is, #CBs/NL≠an integer). The new CW-layer mapping block 700 maps CB0 715*a* and CB1 715*b* to Layer1 710*a* and CB3 715*d* and CB4 715*e* to Layer2 710*b*. Additionally, the CW-layer mapping block 700 separates CB2 715*c* into two portions. A first portion of CB2 715*c*-1 is mapped to Layer1 710*a* and a second portion of CB2 715*c*-2 is mapped to Layer2 710*b*.

Furthermore, the CB segmentation block 410 is used as and the CW-Layer mapping block 700 is utilized, all the examples illustrated in FIGS. 7A through 7C can occur. Depending upon the number of information bits in a TB 407, however, the symbols in CBs may or may not be mapped onto one layer 710.

Alternatively, when new CB segmentation block 600 is used and CW-layer mapping block 700, only the examples illustrated in FIGS. 7A and 7B can occur since the new CB segmentation block 600 ensures that the CW 705 includes of number of CBs 715 corresponding to an integer multiple of the number of layers 710.

Figure 8A:
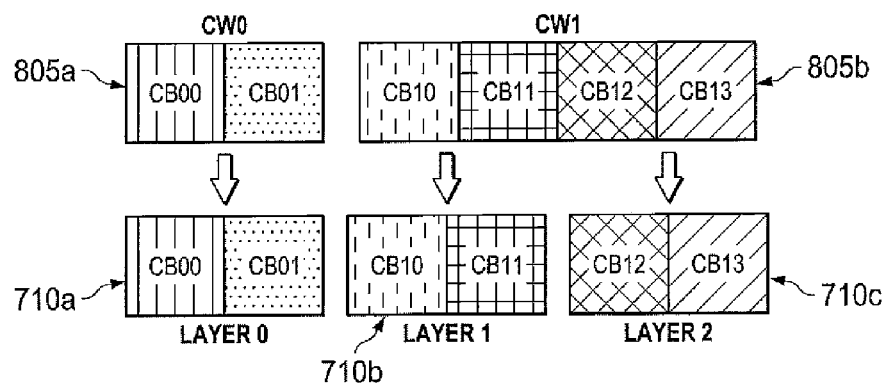
FIGS. 8A-8C illustrate codeword to layer mapping according to embodiments of the present disclosure.
Figure 8B:
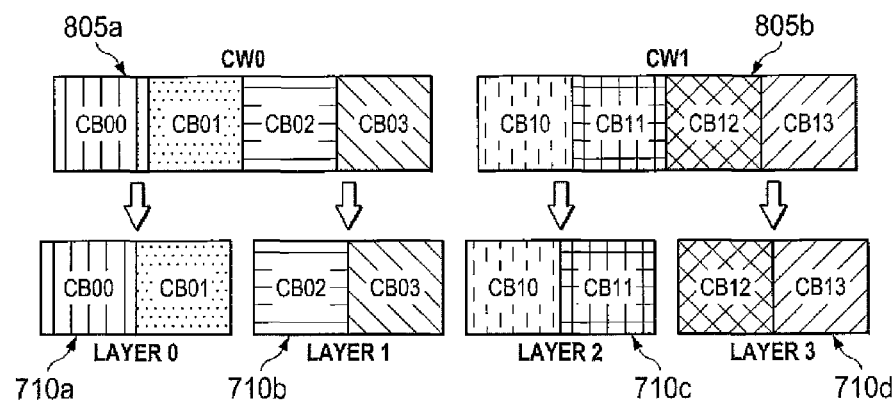
Figure 8C:
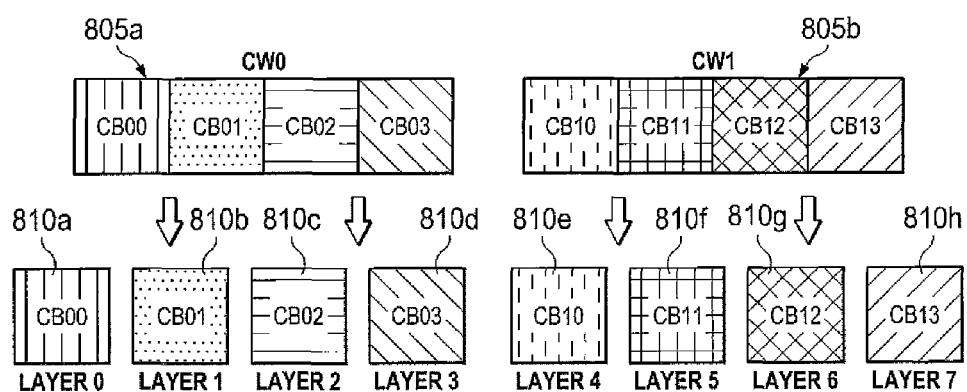

When there are multiple CWs 705 to transmit, each CW 705 can be mapped to its corresponding layers 710 by CW-layer mapping block 700. For example, as illustrated in FIG. 8A, two CWs 805*a*-805*b* can be transmitted on three layers 710*a*-710*c*. A first CW, CW0 805*a*, is mapped onto a first layer, Layer0 810*a*. The second CW, CW1 805*b*, is mapped onto Layer1 810*b* and Layer2 810*c*. In another example, illustrated in FIG. 8B, the two CWs 805*a*-805*b* can be transmitted on four layers, Layer0 810*a*, Layer1 810*b*, Layer2 810*c*, Layer3 810*d*. The first CW, CW0 805*a*, is mapped onto Layer0 810*a* and Layer1 810*b*; while the second CW, CW1 805*b*, is mapped onto Layer2 810*c* and Layer3 810*d*. In another example, as illustrated in FIG. 8C, CW0 805*a* and CW1 805*b* are transmitted on eight layers 810. Each CW 805*a*-805*b* is mapped to four layers, 810*a*-810*d* and 810*e*-810*h* such that CW0 805*a* mapped onto Layer0 810*a*, Layer1 810*b*, Layer2 810*c* and Layer3 810*d* while CW1 805*b* is mapped onto Layer4 810*e*, Layer5 810*f*, Layer6 810*g* and Layer7 810*h*.

Figure 9A:
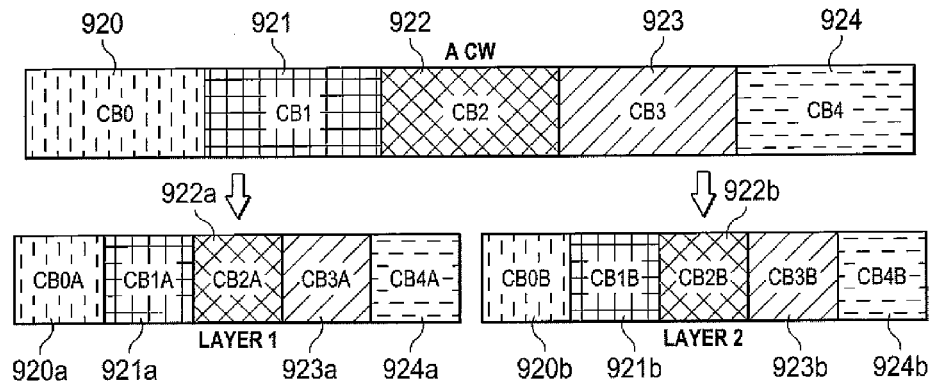
FIGS. 9A-9B illustrate an equal distribution layer mapping method according to embodiments of the present disclosure.
Figure 9B:
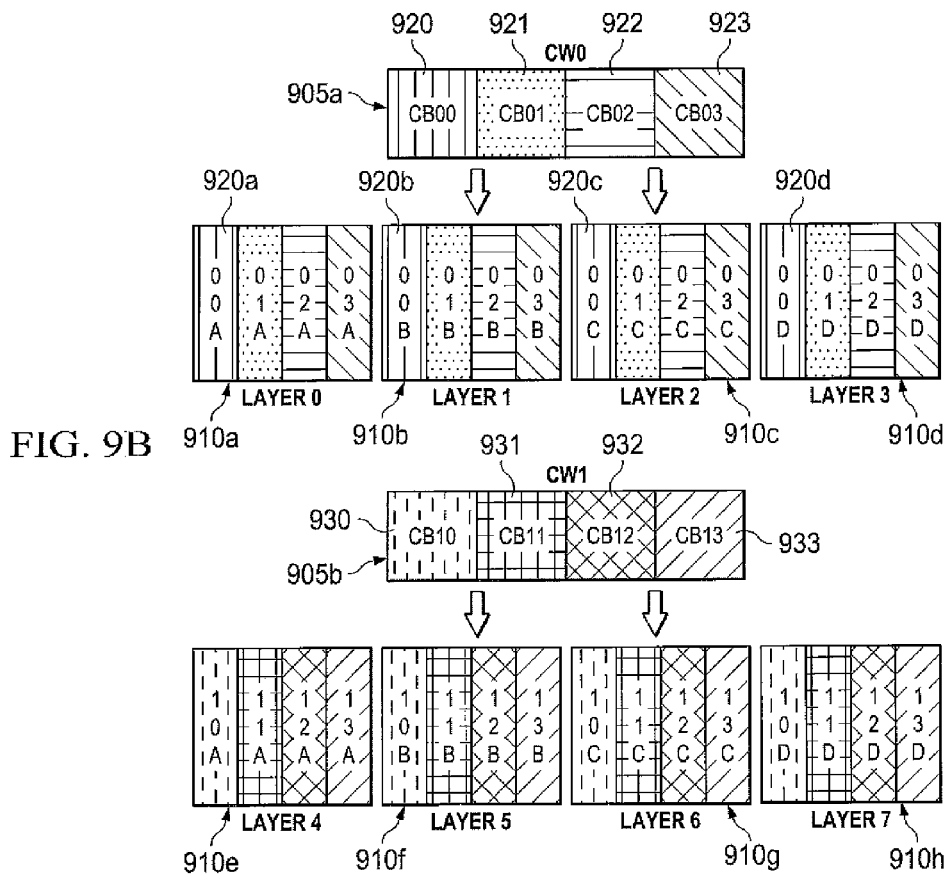

FIGS. 9A-9B illustrate an equal distribution layer mapping method according to embodiments of the present disclosure. The embodiments shown in FIGS. 9A-9B are for illustration only and other embodiments could be used without departing from the scope of this disclosure.

In some embodiments, the CW-layer mapping block 700 can perform an equal distribution layer mapping method (also referred herein as a mapping method B). The CW-layer mapping block 700 can map each CB onto multiple layers such that each layer includes an approximately equal number of modulated symbols of the CB.

When configured to map the CW's to layers using mapping method B, the CW-layer mapping block 700 maps the modulated symbols in a CW 905 by distributing consecutive code-block symbols to the layer. For example, the first symbol, CB0A 920*a* of CB0 920 in the CW 905, is mapped onto Layer0 910*a*, the second symbol, CB0B 920*b* is mapped onto Layer1 910*b*, the first symbol, CB1A 921*a* of CB1 921, is mapped onto Layer0 910*a*, the second symbol, CB1B 921*b* is mapped onto Layer1 910*b*, and so forth. As such, Layer1 910*a* includes the first symbols of each CB: CB0A 920*a*, CB1A 921*a*, CB2A 922*a* and CB3A 923*a*. Additionally, Layer2 910*b* includes the second symbols of each CB: CB0B 920*b*, CB1B 921*b*, CB2B 922*b* and CB3B 923*b*.

Further, as illustrated in FIG. 9B, two codewords 905*a*-905*b* are mapped to eight layers 910*a*-910*h*. The first symbol, '00A' 920*a* of CB00 920 in the CW 905*a*, is mapped onto Layer0 910*a*, the second symbol '00B' 920*b* is mapped onto Layer1 910*b*, '00C' 920*c* to Layer2 910*c*, '00D' 920*d* to Layer3 910*d*, and so forth. Additionally, the first symbols in each of the remaining CB's 921-923 and 930-933 are mapped to Layer0 910*a*, the second symbols are mapped to Layer1 910*b*, and so forth.

The mapping examples illustrated in FIGS. 9A and 9B can layer be constructed by this method, where i=0, . . . , $M_{symb}^{layer}-1$:

When either $N_L=2$ or $N_L=4$, one CW can be mapped to $N_L$ number of layers.

With $N_L=3$, $$\begin{cases} x^{(0)}(i) = d^{(0)}(3i) \\ x^{(1)}(i) = d^{(0)}(3i+1) \\ x^{(2)}(i) = d^{(0)}(3i+2), \end{cases}$$ [Eqn. 8]

where $M_{symb}^{layer} = \lceil M_{symb}^{(0)}/3 \rceil - 1$. If $M_{symb}^{(0)} \bmod 3 = 1$, then two null symbols are appended to $d^{(0)}(M_{symb}^{(0)}-1)$. If $M_{symb}^{(0)} \bmod 3 = 2$, then one null symbol are appended to $d^{(0)}(M_{symb}^{(0)}-1)$.

With a general $N_L$, $x^{(h)}(i)=d^{(0)}(N_L i+1)$, where $h=0, \ldots, N_L-1$ and $M_{symb}^{layer}=\lceil M_{symb}^{(0)}/N_L \rceil-1$. If $M_{symb}^{(0)} \mod N_L \neq 0$, then appropriate number of null symbols are appended to $d^{(0)}(M_{symb}^{(0)}-1)$ such that each layer has $M_{symb}^{layer}$ symbols.

FIGS. 10A-12B illustrates signaling according to embodiments of the present disclosure. The embodiments shown in FIG. 10A-12B are for illustration only. Other embodiments could be used without departing from the scope of this disclosure.

Figure 10A:
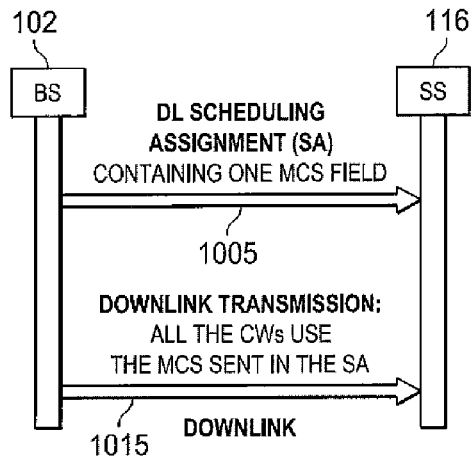
FIGS. 10A-12B illustrate signaling according to embodiments of the present disclosure.
Figure 10B:
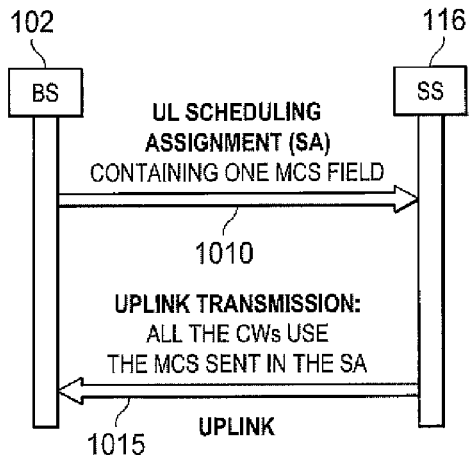

In some embodiments, illustrated in FIGS. 10A and 10B, BS 102 signals only one MCS (modulation and coding scheme) to SS 116, regardless of the number the codewords (transport blocks) being transmitted at SS 116. The MCS field will be carried in one of the downlink scheduling assignments (SA) 1005 or uplink 1010 SA's.

At the MIMO transmitter side, the transmitter uses the same MCS 1015 for all the generated codewords. The transmitter can be either a subscriber station, such as SS 116, or a base station, such as BS 102.

In some embodiments, in the example of a two codeword transmission, BS 102 signals one MCS and one delta-MCS to SS 116. The modulation and coding format of the 1$^{st}$ CW is derived from the MCS field, whereas the modulation and coding format for the 2$^{nd}$ CW is derived jointly from the MCS filed and the delta-MCS filed. For example, the modulation and coding format for the 2$^{nd}$ CW can be derived from the difference between the MCS field and the delta-MCS field.

Figure 11A:
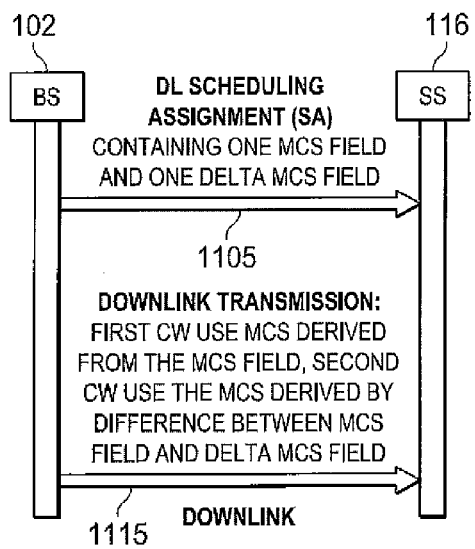
Figure 11B:
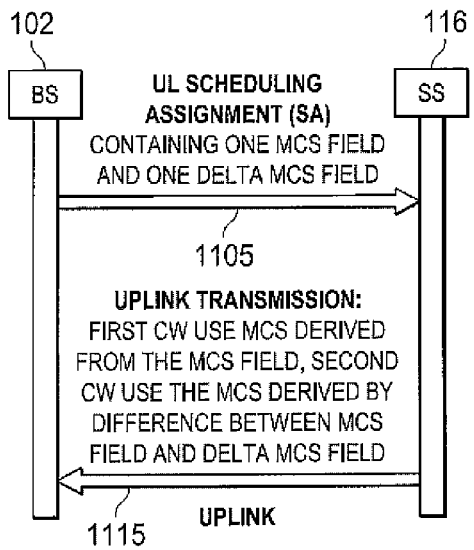
Figure 12A:
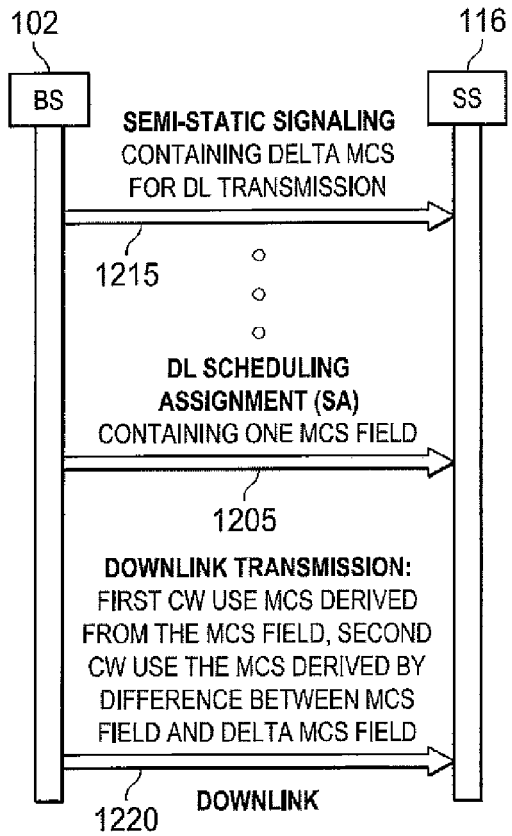
Figure 12B:
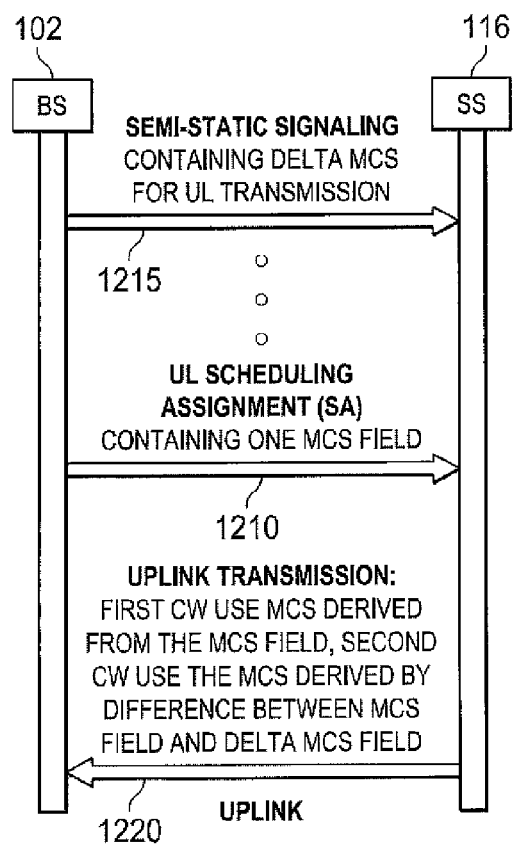

There are two approaches for BS 102 to signal the MCS and delta MCS fields to SS 116:

In the examples illustrated in FIGS. 11A and 11B BS 102 dynamically signals both MCS field and the delta MCS filed in the DL 1105 or UL SA 1110;

In the examples illustrated in FIGS. 12A and 12B, BS 102 signals the MCS field dynamically in the DL SA 1205 or UL SA 1210, and BS 102 signals the corresponding delta MCS semi-statically via UE-specific higher layer signaling 1215, such as RRC signaling, or cell-specific signaling such as broadcast signaling. Accordingly, no need exists to incur the overhead of the delta MCS in the DL SA 1205 or UL SA 1210.

At the MIMO transmitter side, the transmitter uses the same MCS 1220 for all the generated codewords. The transmitter can be either a subscriber station, such as SS 116, or a base station, such as BS 102.

In some embodiments, in the example of a two codeword transmission BS 102 signals one MCS and one delta-MCS to SS 116. The modulation and coding format of the 1$^{st}$ CW is derived from the MCS field, whereas the modulation and coding format for the 2$^{nd}$ CW is derived jointly from the MCS filed and the delta-MCS filed. For example, the modulation and coding format for the 2$^{nd}$ CW can be derived from the difference between the MCS field and the delta-MCS field.

FIGS. 13A through 13E illustrate a two-stage codeword to layer mapping for spatial multiplexing according to embodiments of the present disclosure. The embodiments shown in FIGS. 13A through 13E are for illustration only. Other embodiments could be used without departing from the scope of this disclosure.

In some embodiments, the codeword to layer mapping (such as performed in the layer mapping processes described in FIGS. 3-12B including, but not limited to, layer mapping 305, new codeword to layer mapping block 500 and CW-layer mapping block 700) can be performed in a two-stage layer mapping process 1300. The two stage layer mapping process 1300 includes an initial CW-to-layer mapping block 1305 and a layer remapping block 1310.

The initial CW-to-layer mapping block 1305 maps complex-valued modulation symbols for one or more codewords onto one or more layers. For example, the initial CW-to-layer mapping block 1305 maps the complex-valued modulation symbols $d^{(q)}(0), \ldots, d^{(q)}(M_{symb}^{(q)}-1)$ for codeword onto the $x(i)=[x^{(0)}(i) \ldots x^{(\upsilon-1)}(i)]^T$, for $i=0, 1, \ldots, M_{symb}^{layer}-1$ where $\upsilon$ is the number of layers and $M_{symb}^{layer}$ is the number of modulation symbols per layer. In the uplink transmission, each codeword includes both the data transport block and the uplink CQI/RI as shown in the data/control multiplexing and interleaving block 305 in FIG. 3.

In some embodiments, for up to four (4) layer transmissions in the uplink, the initial mapping block 1305 performs initial CW-to-layer mapping as shown in Table 1:

TABLE 1

| Number of layers | Number of code words | Initial Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$<br>$x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |
| 3 | 2 | $x^{(0)}(i) = d^{(0)}(i)$<br>$x^{(1)}(i) = d^{(1)}(2i)$<br>$x^{(2)}(i) = d^{(1)}(2i + 1)$ | $M_{symb}^{layer} = M_{symb}^{(0)} = M_{symb}^{(1)}/2$ |
| 4 | 2 | $x^{(0)}(i) = d^{(0)}(2i)$<br>$x^{(1)}(i) = d^{(0)}(2i + 1)$<br>$x^{(2)}(i) = d^{(1)}(2i)$<br>$x^{(3)}(i) = d^{(1)}(2i + 1)$ | $M_{symb}^{layer} = M_{symb}^{(0)}/2 = M_{symb}^{(1)}/2$ |

Figure 13A:
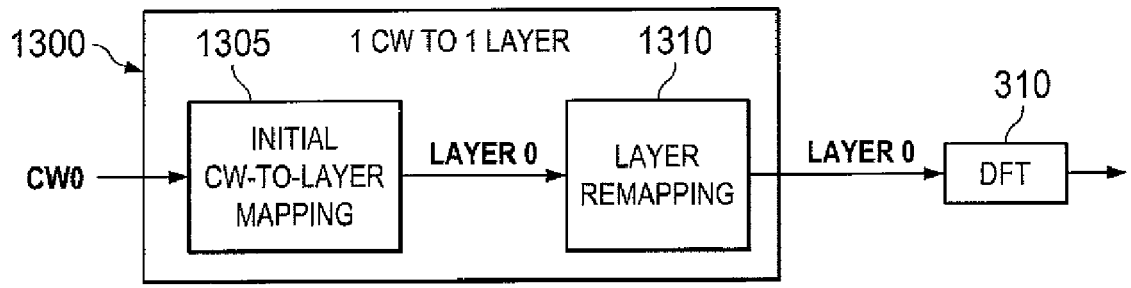
FIGS. 13A through 13E illustrate a two-stage codeword to layer mapping for spatial multiplexing according to embodiments of the present disclosure.
Figure 13B:
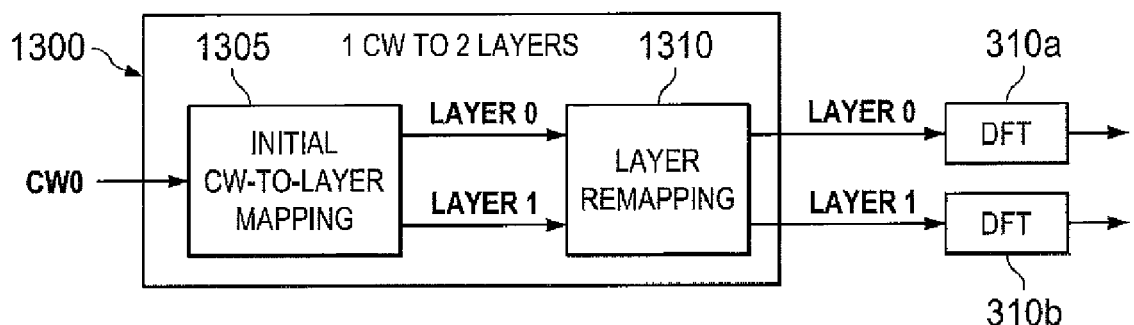
Figure 13C:
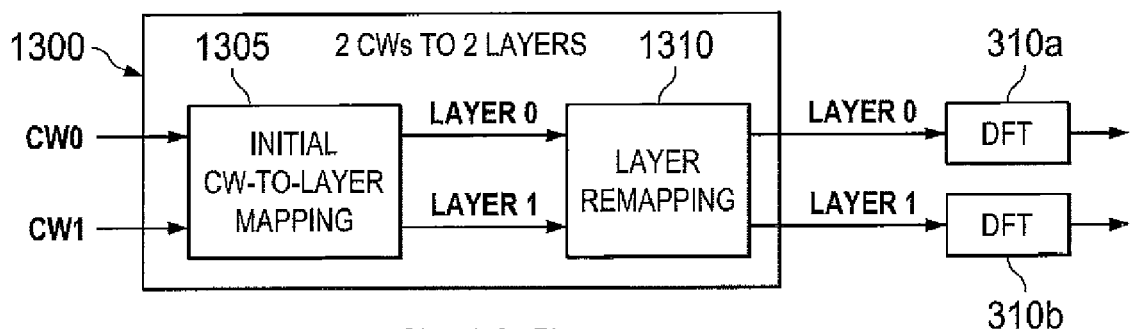
Figure 13D:
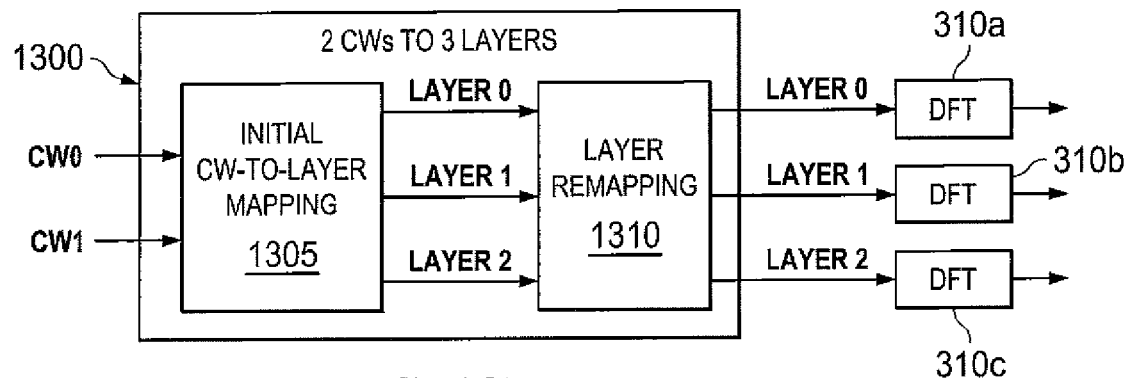
Figure 13E:
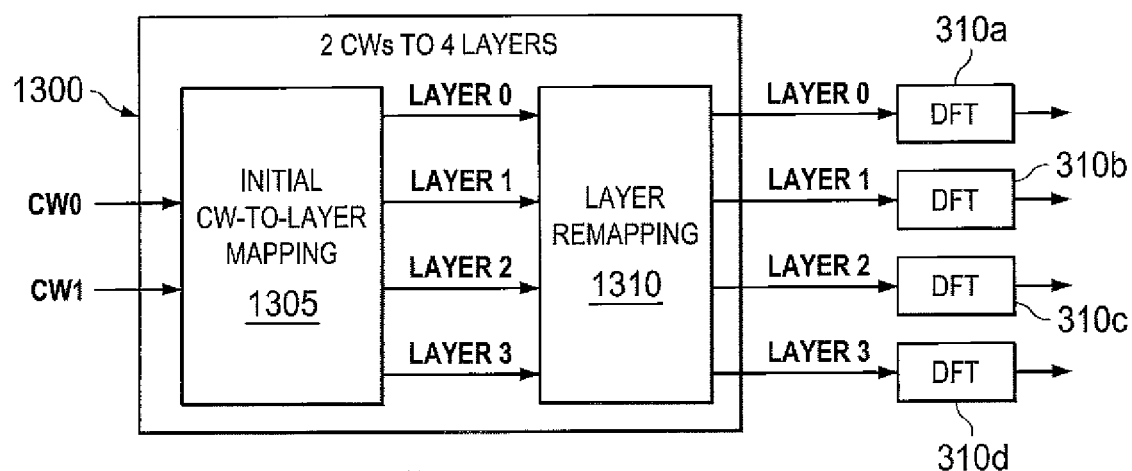

FIG. 13A illustrates one CW, CW0 1315 mapped to one layer, Layer0 1316. FIG. 13B illustrates one CW, CW0 1315 mapped to two layers, Layer0 1320 and Layer1 1321. FIG. 13C illustrates two CWs, CW0 1315, and CW 1316 mapped to two layers, Layer0 1320 and Layer1 1321. FIG. 13D illustrates two CWs, CW0 1315, and CW 1316 mapped to three layers, Layer0 1320, Layer1 1321 and Layer2 1322. FIG. 13E illustrates two CWs, CW0 1315, and CW 1316 mapped to four layers, Layer0 1320, Layer1 1321, Layer2 1322 and Layer3 1324. DFT precoding 310 is performed on the output of the layer re-mapping block 1310.

Figure 14:
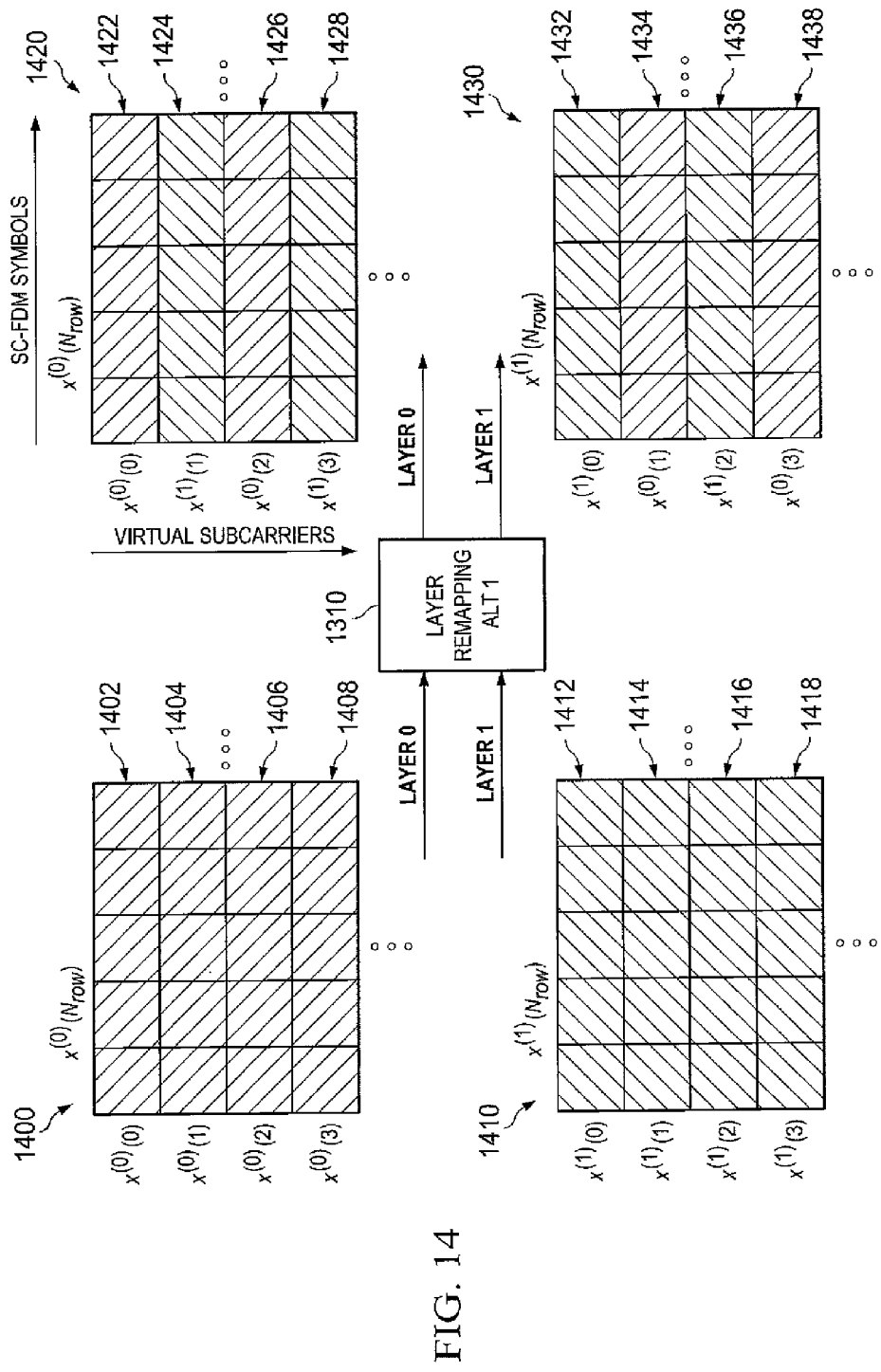
FIGS. 14 though 17 illustrate layer remapping according to embodiments of the present disclosure.

FIGS. 14 though 17 illustrate layer remapping according to embodiments of the present disclosure. The embodiments shown in FIGS. 14 through 17 are for illustration only. Although the embodiments shown in FIGS. 14 though 17 illustrate remapping of two layers, other embodiments, such as one, three or four layers, could be used without departing from the scope of this disclosure.

The layer remapping block 1310 organizes the output of the initial mapping block 1305 into a two-dimensional time/virtual subcarrier resource grid. Herein, the number of rows is denoted as $N_{row}$ and the number of columns is denoted as $N_{col}$, as illustrated in Equation 9:

$$N_{row} \cdot N_{col} = M_{symb}^{layer} \qquad [\text{Eqn. 9}]$$

The symbols at the input of the layer remapping step are $x(i)=[x^{(0)}(i) \ldots x^{(\upsilon-1)}(i)]^T$, for $i=0, 1, \ldots, M_{symb}^{layer}-1$ where $\upsilon$ is the number of layers and $M_{symb}^{layer}$ is the number of modulation symbols per layer. The symbols at the output of the layer remapping step are denoted as $s(i)=[s^{(0)}(i) \ldots s^{(\upsilon-1)}(i)]^T$.

FIG. 14 illustrates a first alternative for layer remapping. The layer remapping block 1310 can perform "row-shuffling" across different layers in the two-dimensional (2D) resource grid. The layer remapping block 1310 row-shuffles according to Equation 10 (assuming the 2D resource grid is arranged in a "virtual-subcarrier first" fashion):

$$s^{(p)}(r \cdot N_{row}+j)=x^q(r \cdot N_{row}+j) \qquad \text{[Eqn. 10]}$$

For r=0, . . . , $N_{col}$−1, j=0, . . . , $N_{row}$−1 and p=0, . . . , v−1, (it is noted that some forms of this equation use "l" instead of "r"). Furthermore, the layer index q is given by Equation 11:

$$q=(p+j) \bmod v \qquad \text{[Eqn. 11]}$$

where v indicates the number of transmission layers.

For example, the first row 1402 of the first input layer 1400 is placed in the first row 1422 in the first output layer 1420; the second row 1414 of the second input layer 1410 is placed in the second row 1424 in the first output layer 1420; the third row 1406 of the first input layer 1400 is placed in the third row 1426 in the first output layer 1420; and the fourth row 1418 of the second input layer 1410 is placed in the fourth row 1428 in the first output layer 1420. Meanwhile, the first row 1402 of the second input layer 1410 is placed in the first row 1432 in the second output layer 1430; a second row of a third input layer is placed in the second row 1434 of the second output layer 1430; and so forth. If third input layer does not exist, then the second row 1404 of the first input layer 1400 is placed in the second row 1434 in the second output layer 1430; the third row 1416 of the second input layer 1410 is placed in the third row 1436 in the second output layer 1430; and the fourth row 1408 of the first input layer 1400 is placed in the fourth row 1438 in the second output layer 1430.

Figure 15:
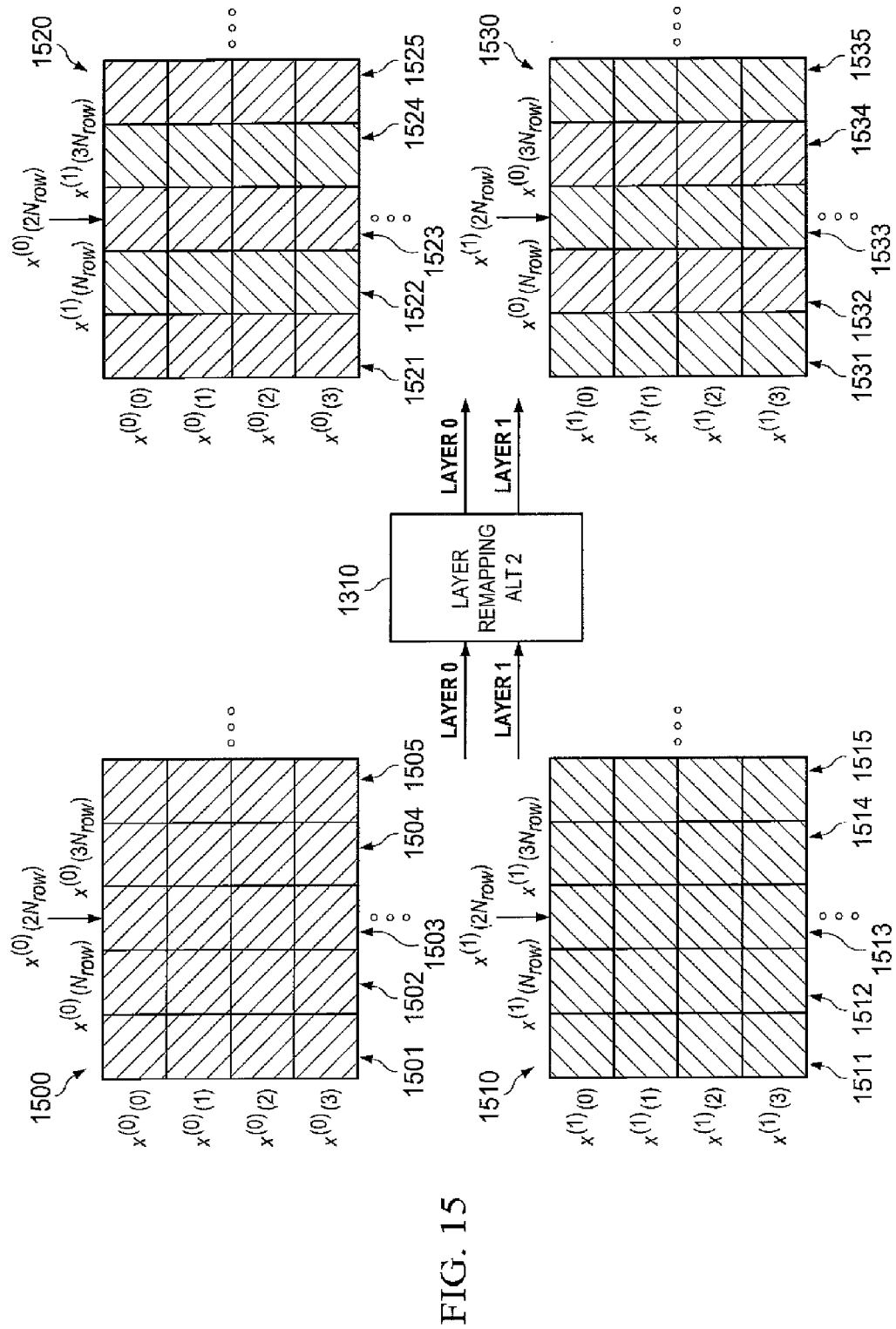

FIG. 15 illustrates a second alternative for layer remapping. The layer remapping block 1310 can perform "column-shuffling" across different layers in the 2D resource grid. The layer remapping block 1310 column-shuffles as defined by Equation 12 (assuming the 2D resource grid is arranged in a "virtual-subcarrier first" fashion):

$$s^{(p)}(r+j \cdot N_{col})=x^q(r+j \cdot N_{col}) \qquad \text{[Eqn. 12]}$$

For r=0, . . . , $N_{col}$−1, j=0, . . . , $N_{row}$−1 and p=0, . . . , v−1, (it is noted that some forms of this equation use "l" instead of "r"). Furthermore, the layer index q is given by Equation 11 (reproduced here):

$$q=(p+j) \bmod v \qquad \text{[Eqn. 11]}$$

For example, the first column 1501 of the first input layer 1500 is placed in the first column 1521 in the first output layer 1520; the second column 1512 of the second input layer 1510 is placed in the second column 1522 in the first output layer 1520; the third column 1503 of the first input layer 1500 is placed in the third column 1523 in the first output layer 1520; the fourth column 1514 of the second input layer 1510 is placed in the fourth column 1524 in the first output layer 1520; and the fifth column 1505 of the first input layer 1500 is placed in the fifth column 1525 in the first output layer 1520. Meanwhile, the first column 1511 of the second input layer 1510 is placed in the first column 1431 in the second output layer 1530; a second column of a third input layer is placed in the second column 1532 of the second output layer 1530; and so forth. If third input layer does not exist, then the second column 1502 of the first input layer 1500 is placed in the second column 1532 in the second output layer 1530; the third column 1513 of the second input layer 1510 is placed in the third column 1533 in the second output layer 1530; the fourth column 1504 of the first input layer 1500 is placed in the fourth column 1534 in the second output layer 1530; and the fifth column 1515 of the second input layer 1510 is placed in the fifth column 1535 in the second output layer 1530.

Figure 16A:
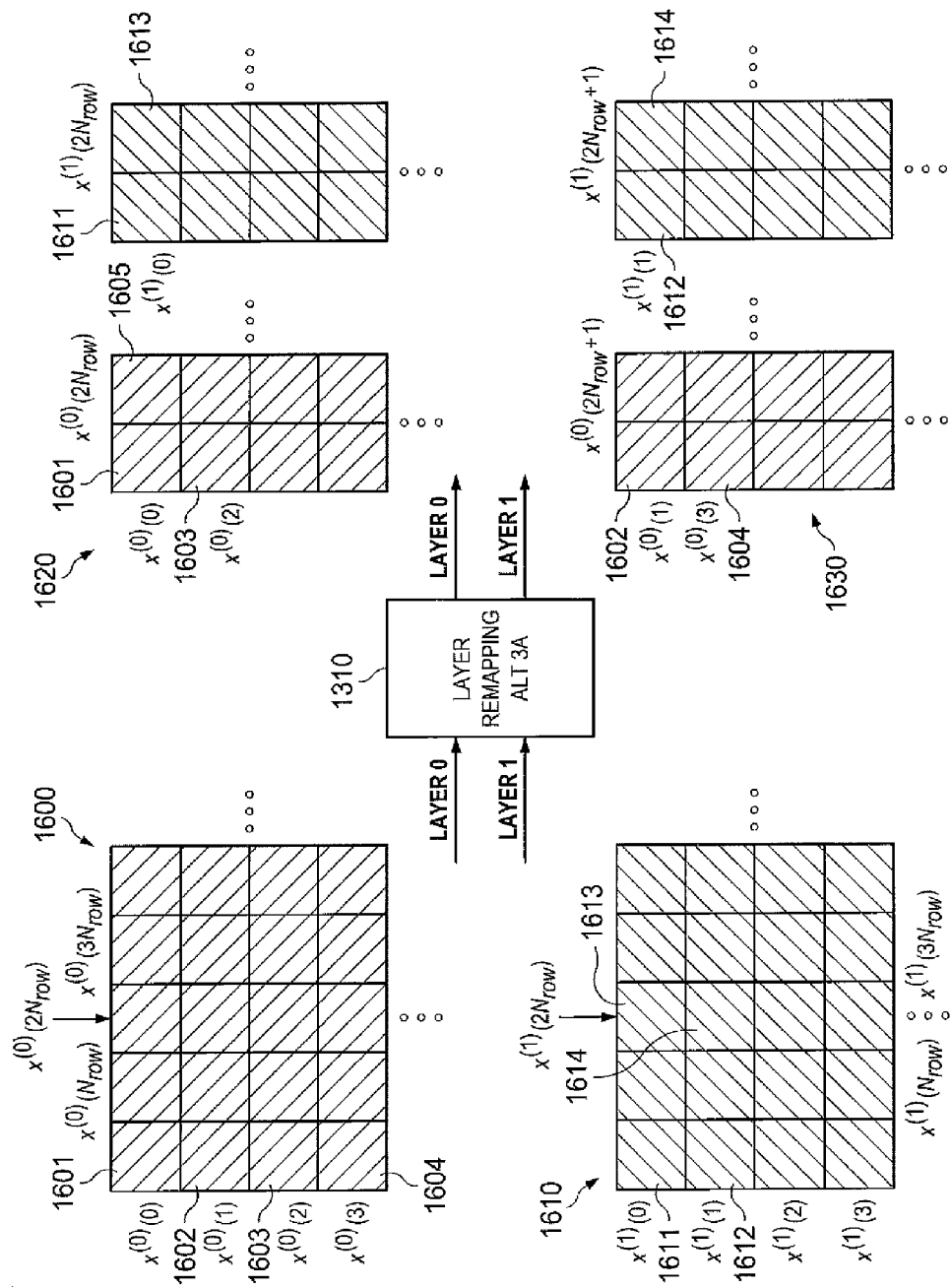
Figure 16B:
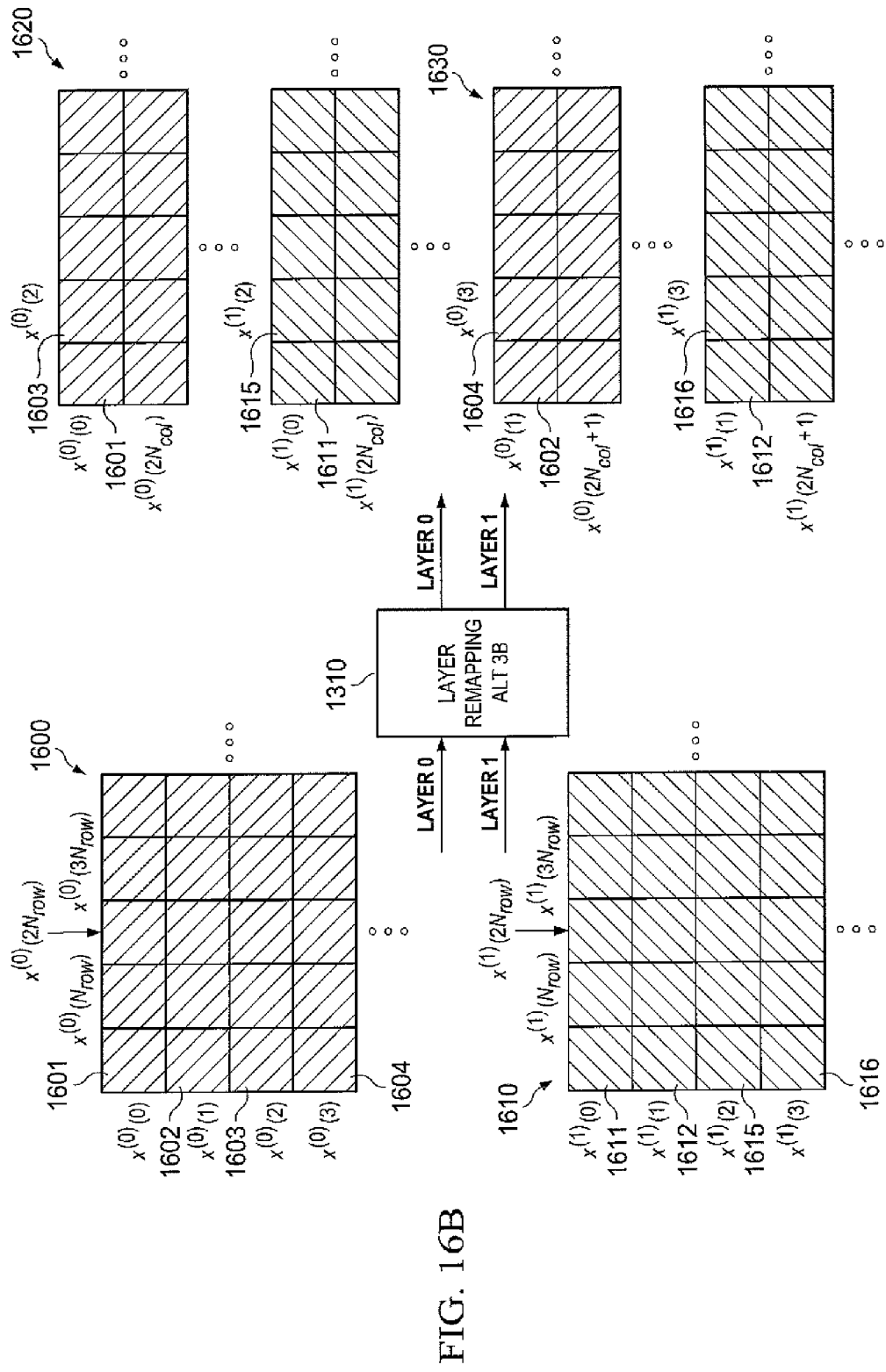

FIGS. 16A through 16B illustrate a third alternative for layer remapping. The layer remapping block 1310 aggregates the modulation symbols in all input layers in a sequential manner to generate an intermediate sequence, t(i), i=0, . . . , $v \cdot M_{symb}^{layer}$−1. The aggregation process can be defined by Equation 13:

$$t(p \cdot M_{symb}^{layer}+j)=x^q(j) \qquad \text{[Eqn. 13]}$$

For q=0, . . . , v−1 and j=0, . . . , $M_{symb}^{layer}$−1. Thereafter, the symbols in the output layer are mapped onto the output layers by Equation 14:

$$s^{(p)}(i)=t(v^*i+p) \qquad \text{[Eqn. 14]}$$

For p=0, . . . , v−1 and i=0, . . . , $M_{symb}^{layer}$−1.

For example, FIG. 16A illustrates an embodiment using a "virtual subcarrier-first" process. A first symbol 1601 is mapped from the first input layer 1600 to the first output layer 1620. A second symbol 1602 is mapped from the first input layer 1600 to the second output layer 1630. A third symbol 1603 is mapped from the first input layer 1600 to the first output layer 1620. A fourth symbol 1608 is mapped from the first input layer 1600 to the second output layer 1630. A fifth symbol 1605 is mapped from the first input layer 1600 to the first output layer 1620, and so forth. Further, a first symbol 1611 from the second input layer 1610 to the first output layer 1620. A second symbol 1612 from the second input layer 1610 is mapped to the second output layer 1630. A third symbol 1613 from the second input layer 1610 to the first output layer 1620. A fourth symbol 1614 from the second input layer 1610 to the second output layer 1630, and so forth.

Further, FIG. 16B illustrates an embodiment using a "time-first" approach. A first symbol 1601 is mapped from the first input layer 1600 to the first output layer 1620. A second symbol 1602 is mapped from the first input layer 1600 to the second output layer 1630. A third symbol 1603 is mapped from the first input layer 1600 to the first output layer 1620. A fourth symbol 1608 is mapped from the first input layer 1600 to the second output layer 1630, and so forth. Further, a first symbol 1611 from the second input layer 1610 is mapped to the first output layer 1620. A second symbol 1612 from the second input layer 1610 is mapped to the second output layer 1630. Another symbol 1615 from the second input layer 1610 is mapped to the first output layer 1620. Another symbol 1616 from the second input layer 1610 is mapped to the second output layer 1630, and so forth.

Figure 17:
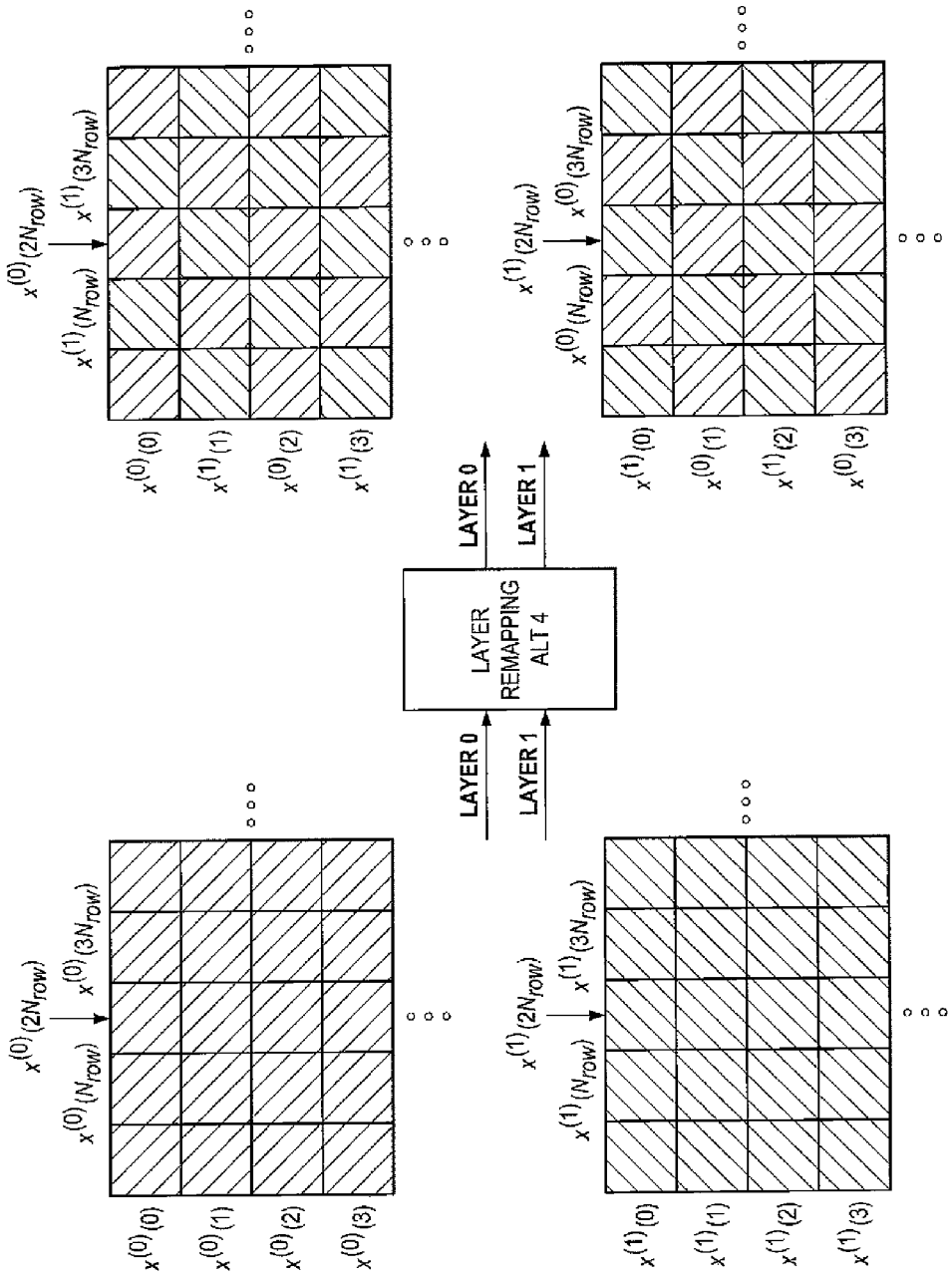

FIG. 17 illustrates a second alternative for layer remapping. The layer remapping block 1310 can perform "2-D interlacing" across different layers in the 2-D resource grids. The layer remapping block 1310 performs 2-D interlacing as defined by Equation 10 (reproduced here):

$$s^{(p)}(r \cdot N_{row}+j)=x^q(r \cdot N_{row}+j) \qquad \text{[Eqn. 10]}$$

For r=0, . . . , $N_{col}$−1, j=0, . . . , $N_{row}$−1 and p=0, . . . , v−1, (it is noted that some forms of this equation use "l" instead of "r"). However, the layer index q is given by Equation 15:

$$q=(p+j+r) \bmod v \qquad \text{[Eqn. 15]}$$

where v indicates the number of transmission layers.

Figure 18:
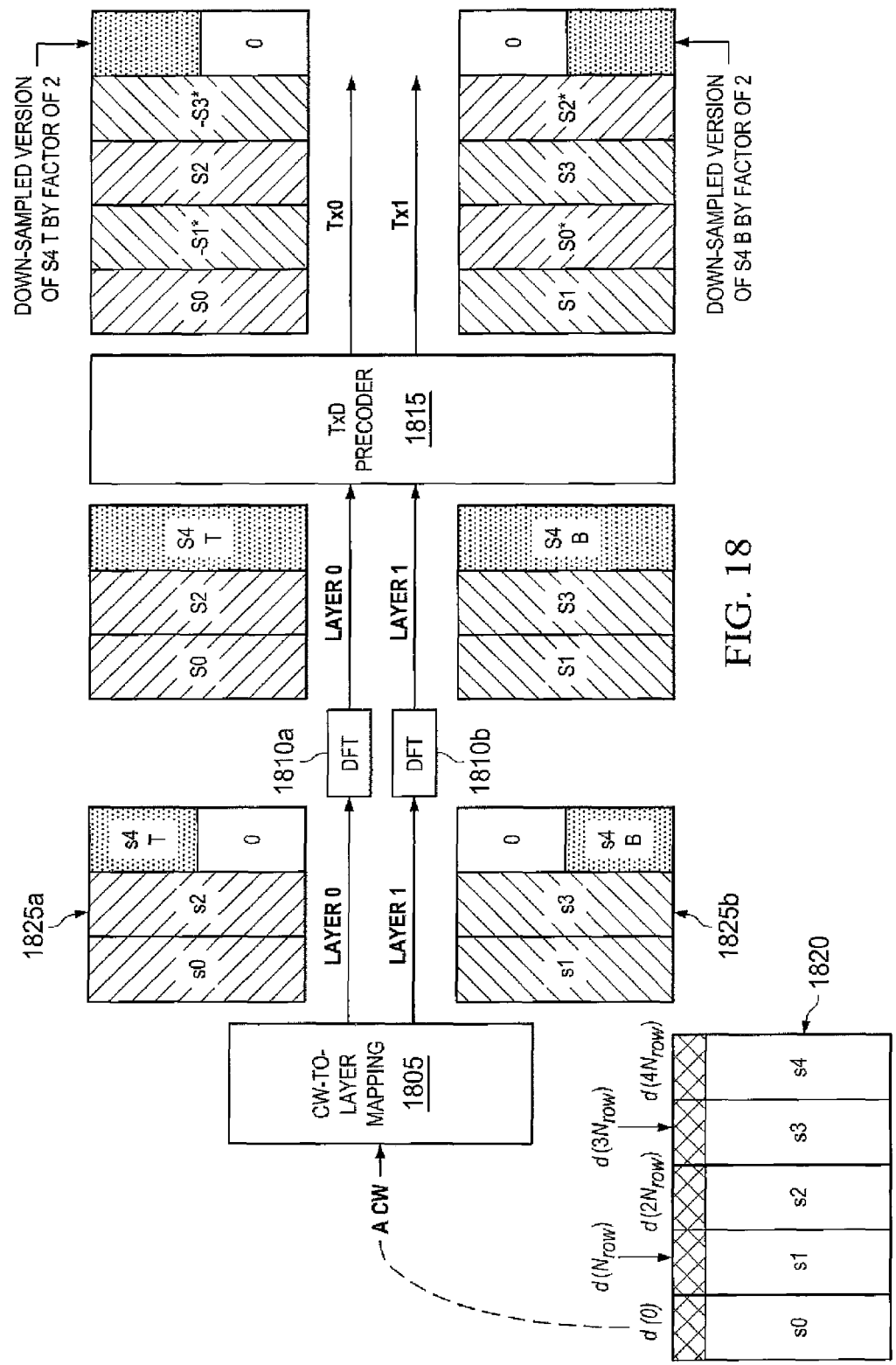
FIG. 18 illustrates transmitter blocks for a 2-Tx Alamouti transmit diversity space-time block code according to embodiments of the present disclosure.

FIG. 18 illustrates transmitter blocks for a 2-Tx Alamouti transmit diversity space-time block code according to embodiments of the present disclosure. The embodiment shown in FIG. 18 is for illustration only. Other embodiments could be used without departing from the scope of this disclosure.

The Alamouti transmit diversity space-time block code can be implemented at the transmitter 1700 in three stages, CW-to-layer mapping block 1805, two DFTs blocks 1810a-1810b, and the TxD precoder 1815.

Figure 19:
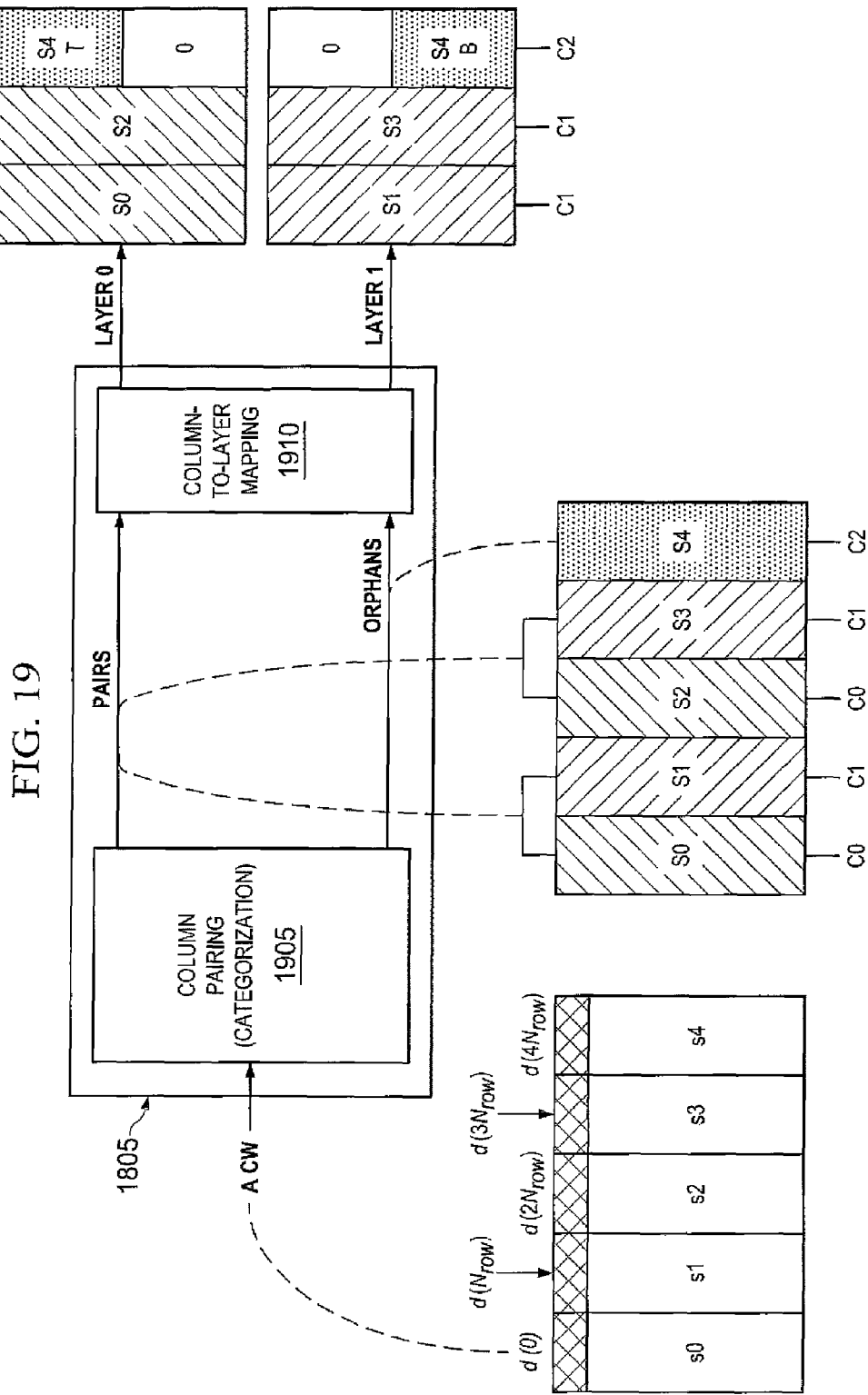
FIG. 19 illustrates a codeword-to-layer mapping block according to embodiments of the present disclosure.

The CW-to-layer mapping block 1805 can include a column pairing block 1905 and column-to-layer mapping block 1910, as illustrated in FIG. 19. The CW 1820 input is organized into a two-dimensional resource grid. Here the number of rows is denoted as $N_{row}$ and the number of columns is denoted as $N_{col}$ as illustrated in Equation 16:

$$N_{col} \cdot N_{row} = N_{symb} \quad [\text{Eqn. 16}]$$

The column pairing block 1905 can perform column categorization. In column categorization, the column pairing block 1905 can pair a number of the columns while leaving a other columns unpaired (for example, a portion of the CW 1820 input is paired and a portion is unpaired). Each of the two columns in a pair is categorized into either C0 or C1. Unpaired columns (or orphans) are categorized into C2.

In one example of set categorization, columns are paired up starting from the first column. The first column in a pair is categorized into C0, while the second into C2. Any left-over columns, if they exist, are categorized into C2.

The column-to-layer mapping block 1910 maps symbols in each column onto layers, depending on the category. In some embodiments, the column-to-layer mapping block 1910 starts from the first column. The category of the column is checked. Depending upon the category, the column is mapped to different layers in different methods. If the category of the column is C0, that is, the first column of a pair, then the column is appended to the columns that already mapped to layer0. Alternatively, if the category of the column is C1, that is, the second column of a pair, then the column is appended to the columns that already mapped to layer1. Finally, if the category of the column is C2, that is, an orphan, the first half symbols and $N_{row}/2$ zeros are appended to the columns that already mapped to layer1, and $N_{row}/2$ zeros and the second half symbols are appended to the columns that already mapped to layer1.

The column-to-layer mapping block 1910 can perform column to layer mapping as defined by the following stages:

For $m_0=0$ and $m_1=0$ and for each of $h=0, 1, \ldots, M_{col}$ (it is noted that some forms of this equation use "l" instead of "h"), if the $h^{th}$ set belongs to C0, then the symbols in the set are appended to the last symbol mapped to layer0. If no symbols have been mapped to layer0 the symbols in the set are mapped to layer0 according to Equation 17:

$$s^{(0)}(m_0 M_{row}+i) = d(hM_{row}+i), \quad [\text{Eqn. 17}]$$

where $i=0, 1, \ldots M_{row}-1$ (it is noted that some forms of this equation use "l" instead of "h"). Then, $m_0$ is incremented by '1.'

For $m_0=0$ and $m_1=0$ and for each of $h=0, 1, \ldots, M_{col}$, if the $h^{th}$ set belongs to C1, then the symbols in the set are appended to the last symbol mapped to layer1. If no symbols have been mapped to layer1, the symbols in the set are mapped to layer1 according to Equation 18:

$$s^{(1)}(m_1 M_{row}+i) = d(hM_{row}+i) \quad [\text{Eqn. 18}]$$

where $i=0, 1, \ldots M_{row}-1$ (it is noted that some forms of this equation use "l" instead of "h"). Then, $m_1$ is incremented by '1.' or $m_0=0$ and $m_1=0$ and for each of $h=0, 1, \ldots, M_{col}$, if the $h^{th}$ set belongs to C2:

The first half symbols followed by $M_{row}/2$ zeros are appended to the last symbol mapped to layer0 according to Equation 19:

$$s^{(0)}(m_0 M_{row}+i) = \begin{cases} d(hM_{row}+i), & i=0,1,\ldots,M_{row}/2-1 \\ 0, & i=M_{row}/2,\ldots,M_{row}-1 \end{cases} \quad [\text{Eqn. 19}]$$

(It is noted that some forms of this equation use "l" instead of "h"). Then, $m_0$ is incremented by '1.'

The second half symbols preceded by $M_{row}/2$ zeros are appended to the last symbol mapped to layer 1 according to Equation 20:

$$s^{(1)}(m_1 M_{row}+i) = \begin{cases} 0, & i=0,1,\ldots,M_{row}/2-1 \\ d(hM_{row}+i), & i=M_{row}/2,\ldots,M_{row}-1 \end{cases} \quad [\text{Eqn. 20}]$$

(It is noted that some forms of this equation use "l" instead of "h"). Then, $m_1$ is incremented by '1.' Further: $M = m_0 = m_1$.

For each layer 1825a-1825b (it will be understood that embodiments with more than two layers could be used without departing from the scope of this disclosure), DFT percoding 1810 is applied at the output of the CW-to-layer mapping 1805. The block of complex-valued symbols for the $p^{th}$ layer, $s^{(p)}(0), \ldots, s^{(p)}(M_{symb}^{layer}-1)$ is divided into $N_{col}$ sets, each set corresponding to one uplink symbol. Transform precoding can be applied according to Equation 21:

$$z^{(p)}(h \cdot N_{row}+k) = \frac{1}{\sqrt{N_{row}}} \sum_{i=0}^{N_{row}-1} s^{(p)}(h \cdot N_{row}+i) e^{-j\frac{2\pi i k}{N_{row}}}. \quad [\text{Eqn. 21}]$$

For $k=0, \ldots, N_{row}-1$, and $h=0, \ldots, N_{col}-1$ (it is noted that some forms of this equation use "l" instead of "h"). Equation 21 yields a block of complex-valued symbols $z^{(p)}(0), \ldots, z^{(p)}(M_{symb}^{layer}-1)$, for $p=0, \ldots, \nu-1$.

In some embodiments, the TxD precoding block 1815, starting from the first column in each layer, check the category of the column in layer0. Depending upon the category, the columns in both layers are precoded in different methods. For example, if the category of the column is C0, then the column in Layer0 is appended to the columns that already mapped to Tx0, and the column in Layer1 is further appended there after taking a complex conjugate and sign-reverse operation. Additionally, the column in Layer1 is appended to the columns that already are mapped to Tx1, and the column in Layer0 is further appended there after taking a complex conjugate operation.

Figure 20:
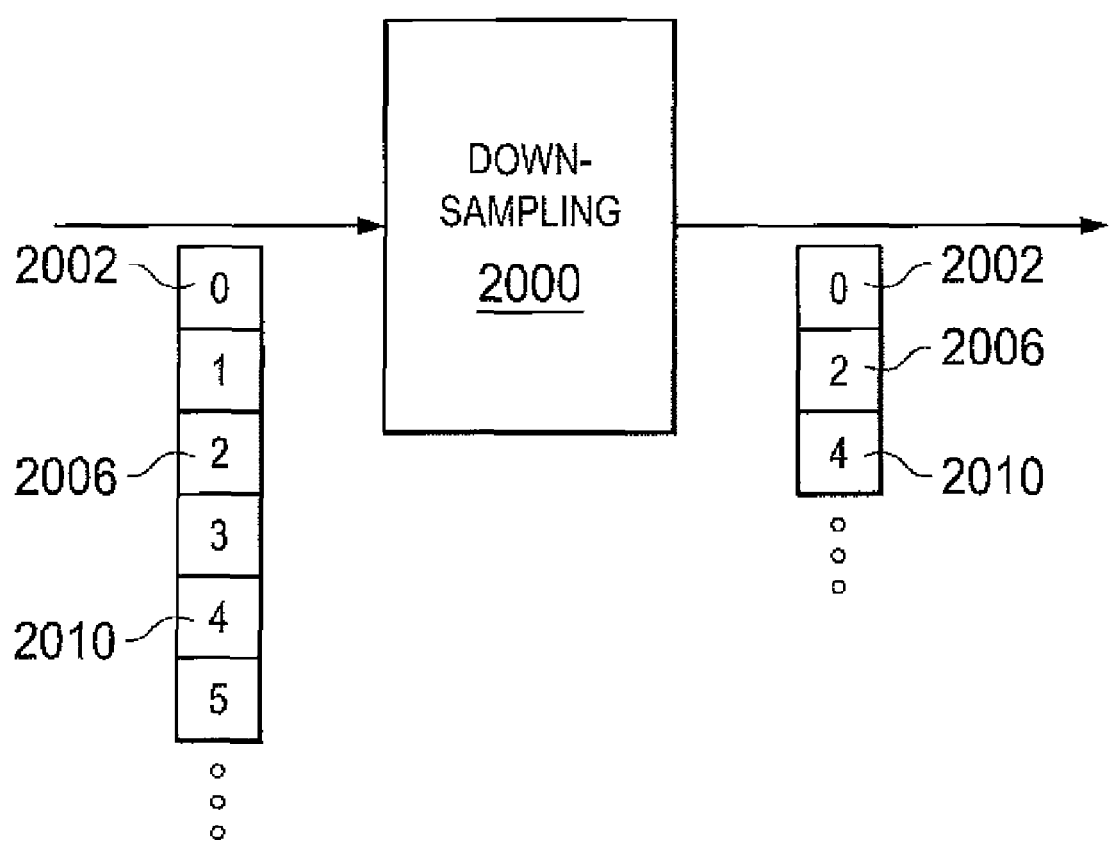
FIG. 20 illustrates a down-sampling block according to embodiments of the present disclosure.

After transmit precoding by the TxD precoding block 1815, a down-sampling function is applied to the orphans by down-sampling block 2000. Down-sampling block 2000 is illustrated in FIG. 20. The down sampling block 2000 downsamples the output from the TxD precoding block 1815 and prior to an IFFT function. For example, if the category of the column is C2 (that is, it is originated from an orphan column) the symbols first are down-sampled in the columns in both layers by a factor of two (2). That is, only symbols in each column on the first 2002, the third 2006, the fifth 2010, and so forth, scaled by $\sqrt{2}$. Then, the down-sampled $N_{row}/2$ symbols of the column in Layer0 are appended to the columns that already are mapped to Tx0, with $N_{row}/2$ trailing zeros. Additionally, the down-sampled $N_{row}/2$ symbols of the column in Layer0 are appended to the columns that already mapped to Tx0, with $N_{row}/2$ leading zeros.

The down-sampling block 2000 can perform down-sampling according to the following stages:

The symbols in a layer are partitioned into M sets of consecutive symbols, $\{X^{(n)}(i)\}, \{X^{(n)}(M_{SC}^{PUSCH}+i)\}, \ldots, \{X^{(n)}((M-1)M_{SC}^{PUSCH}+i)\}$, $i=0, 1, \ldots, M_{SC}^{PUSCH}-1$, $n=0, 1$. For $m=0$ and for each of $h=0, \ldots, M-1$:

If the $h^{th}$ set in Layer0 belongs to C0, the symbols in the $h^{th}$ set in Layer0, followed by the conjugated and sign-flipped symbols in the $h^{th}$ set in Layer1, are appended to the last symbol to the set of symbols going to antenna port 0 as further defined by Equation 22:

$$\begin{cases} y^{(0)}(mM_{sc}^{PUSCH}+i) = X^{(0)}(hM_{sc}^{PUSCH}+i) \\ y^{(0)}((m+1)M_{sc}^{PUSCH}+i) = -(X^{(1)}(hM_{sc}^{PUSCH}+i))^*, \end{cases} \quad [\text{Eqn. 22}]$$

where i=0, 1, ... $M_{SC}^{PUSCH}$−1 (it is noted that some forms of this equation use "l" instead of "h"). Then m is incremented by '2.'

For m=0 and for each of h=0, ..., M−1: the symbols in the $h^{th}$ set in Layer1, followed by the conjugated symbols in the $h^{th}$ set in Layer0, are appended to the last symbol to the set of symbols going to antenna port 1 as further defined by Equation 23:

$$\begin{cases} y^{(1)}(mM_{sc}^{PUSCH}+i) = X^{(1)}(hM_{sc}^{PUSCH}+i) \\ y^{(1)}((m+1)M_{sc}^{PUSCH}+i) = (X^{(0)}(hM_{sc}^{PUSCH}+i))^*, \end{cases} \quad [\text{Eqn. 23}]$$

where i=0, 1, ... $M_{SC}^{PUSCH}$−1 it is noted that some forms of this equation use "l" instead of "h"). Then m is incremented by '2.'

If the $h^{th}$ set in Layer0 belongs to C2, the even-th symbols in the $h^{th}$ set in Layer0, followed by $M_{SC}^{PUSCH}/2$ zeros, are appended to the last symbol to the set of symbols going to antenna port 0 as further defined by Equation 24:

$$y^{(0)}(mM_{sc}^{PUSCH}+i) = \quad [\text{Eqn. 24}]$$
$$\begin{cases} \sqrt{2}\,X^{(0)}(hM_{sc}^{PUSCH}+2i), & i=0,1,\ldots,M_{sc}^{PUSCH}/2-1 \\ 0, & i=M_{sc}^{PUSCH}/2,\ldots,M_{sc}^{PUSCH}-1. \end{cases}$$

Then m is incremented by '1.'

The even$^{th}$ symbols in the $h^{th}$ set in Layer1, preceded by $M_{SC}^{PUSCH}/2$ zeros, are appended to the last symbol to the set of symbols going to antenna port 1 as further defined by Equation 25:

$$y^{(1)}(mM_{sc}^{PUSCH}+i) = \quad [\text{Eqn. 25}]$$
$$\begin{cases} 0, & i=0,1,\ldots,M_{sc}^{PUSCH}/2-1 \\ \sqrt{2}\,X^{(1)}(hM_{sc}^{PUSCH}+2i), & i=M_{sc}^{PUSCH}/2,\ldots,M_{sc}^{PUSCH}-1. \end{cases}$$

Then m is incremented by '1.'

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communication network, a mobile station capable of communicating via an uplink transmission to at least one base station in the wireless network, the mobile station comprising:
    a plurality of transmit antennas; and
    a controller coupled to the plurality of transmit antenna, the controller configured to map at least one codeword to an $N_L$ number of layers, wherein one of the at least one codeword comprises a plurality of code blocks, wherein the controller is configured to generate the plurality of code blocks from a transport block such that a number of the plurality of code blocks generated is equal to $k \times N_L$, wherein k is an integer value.

2. The mobile station of claim 1, wherein the number of the plurality of code blocks generated further is defined by:

$C = N_L \lceil C'/N_L \rceil$; and $C' = \lceil B/(Z-L) \rceil$, wherein B corresponds to a number of bits for the transport block and a transport block cyclic redundancy check (CRC), Z corresponds to a maximum code block size and L is a length of a code block CRC sequence attached to each of the plurality of code blocks.

3. The mobile station of claim 1, wherein the controller is configured to map the one of the at least one codeword to the $N_L$ layers such that each of the $N_L$ layers comprises k code blocks.

4. The mobile station of claim 3, wherein the controller is configured to map the one of the at least one codeword to the $N_L$ layers using a layer-first mapping method such that a first group of k consecutive code blocks is mapped to a first layer and a second group of k consecutive code blocks is mapped to a second layer.

5. The mobile station of claim 4, wherein the controller is configured to map the one of the at least one codeword to the $N_L$ layers using a layer-first mapping method according to an equation defined as:
    $x^{(h)}(i) = d^{(0)}(i + hM_{symb}^{layer})$, wherein h corresponds to a layer in the $N_L$ number of layers, i corresponds to a symbol number in the layer, $x^{(h)}(i)$ corresponds to ith symbol in hth layer, $d^{(0)}(k)$ corresponds to kth symbol in the one of the at least one codeword, k is a dummy variable, and $M_{symb}^{layer}$ corresponds to a total number of symbols in the layer.

6. The mobile station of claim 1, wherein the controller is further configured to receive:
    semi-static signaling containing a delta modulation and coding scheme in a higher layer; and
    a scheduling assignment containing a modulation and coding scheme field,
    wherein the controller is configured to generate:
        a first codeword based on the modulation and coding scheme field; and
        a second codeword based on a difference between the modulation and coding scheme field and the delta modulation and coding scheme.

7. For use in a wireless communication network, a method for codeword to layer mapping, the method comprising:
    receiving by a plurality of transmit antennas a transport block comprising a plurality of information bits;
    generating at least one codeword for mapping onto $N_L$ number of layers, the at least one codeword comprising a plurality of code blocks, wherein generating the at least one codeword comprises generating the plurality of code blocks from the transport block such that a number of the plurality of code blocks generated is equal to $k \times N_L$, wherein k is an integer value; and
    mapping the at least one codeword onto the $N_L$ number of layers.

8. The method of claim 7, wherein the number of the plurality of code blocks generated further is defined by:

$C = N_L \lceil C'/N_L \rceil$; and $C' = \lceil B/(Z-L) \rceil$, wherein B corresponds to a number of bits for the transport block and a transport block cyclic redundancy check (CRC), Z corresponds to a maximum code block size and L is a length of a code block CRC sequence attached to each of the plurality of code blocks.

9. The method of claim 7, wherein mapping comprises mapping one of the at least one codeword to the $N_L$ layers such that each of the $N_L$ layers comprises k code blocks.

10. The method of claim 9, wherein mapping comprises mapping the one of the at least one codeword to the $N_L$ layers using a layer-first mapping method such that a first group of k consecutive code blocks is mapped to a first layer and a second group of k consecutive code blocks is mapped to a second layer.

11. The method of claim 10, wherein mapping the one of the at least one codeword to the $N_L$ layers comprises using a layer-first mapping method according to an equation defined as:

$x^{(h)}(i)=d^{(0)}(i+hM_{symb}^{layer})$ wherein h corresponds to a layer in the $N_L$ number of layers, i corresponds to a symbol number in the layer, $x^{(h)}(i)$ corresponds to ith symbol in hth layer, $d^{(0)}(k)$ corresponds to kth symbol in the one of the at least one codeword, k is a dummy variable, and $M_{symb}^{layer}$ corresponds to a total number of symbols in the layer.

12. The method of claim 7, further comprising:
receiving semi-static signaling containing a delta modulation and coding scheme in a higher layer;
receiving a scheduling assignment containing a modulation and coding scheme field; and
generating a first codeword based on the modulation and coding scheme field and a second codeword based on a difference between the modulation and coding scheme field and the delta modulation and coding scheme.

13. A transmission apparatus for use in a mobile station capable of communicating via an uplink transmission to at least one base station in a wireless network, the transmission apparatus comprising:
a transceiver coupled to a plurality of transmit antennas; and
a controller coupled to the transceiver, the controller configured to map at least one codeword to an $N_L$ number of layers, wherein one of the at least one codeword comprises a plurality of code blocks, wherein the controller is configured to generate the plurality of code blocks from a transport block such that a number of the plurality of code blocks generated is equal to $k \times N_L$.

14. The transmission apparatus of claim 13, wherein k is an integer value.

15. The transmission apparatus of claim 13, wherein the number of the plurality of code blocks generated further is defined by:

$C=N_L \lceil C'/N_L \rceil$; and $C'=\lceil B/(Z-L) \rceil$, wherein B corresponds to a number of bits for the transport block and a transport block cyclic redundancy check (CRC), Z corresponds to a maximum code block size and L is a length of a code block CRC sequence attached to each of the plurality of code blocks.

16. The transmission apparatus of claim 13, wherein the controller is configured to map the one of the at least one codeword to the $N_L$ layers such that each of the $N_L$ layers comprises k code blocks.

17. The transmission apparatus of claim 16, wherein the controller is configured to map the one of the at least one codeword to the $N_L$ layers using a layer-first mapping method such that a first group of k consecutive code blocks is mapped to a first layer and a second group of k consecutive code blocks is mapped to a second layer.

18. The transmission apparatus of claim 17, wherein the controller is configured to map the one of the at least one codeword to the $N_L$ layers using a layer-first mapping method according to an equation defined as:

$x^{(h)}(i)=d^{(0)}(i+hM_{symb}^{layer})$ wherein h corresponds to a layer in the $N_L$ number of layers, i corresponds to a symbol number in the layer, $x^{(h)}(i)$ corresponds to ith symbol in hth layer, $d^{(0)}(k)$ corresponds to kth symbol in the one of the at least one codeword, k is a dummy variable, and $M_{symb}^{layer}$ corresponds to a total number of symbols in the layer.

19. The transmission apparatus of claim 13, wherein the controller is further configured to receive:
semi-static signaling containing a delta modulation and coding scheme in a higher layer; and
a scheduling assignment containing a modulation and coding scheme field,
wherein the controller is configured to generate:
a first codeword based on the modulation and coding scheme field; and
a second codeword based on a difference between the modulation and coding scheme field and the delta modulation and coding scheme.

20. The transmission apparatus of claim 13, wherein the controller is configured to map the one of the at least one codeword to the $N_L$ layers such that each of the plurality of code blocks is mapped to each of the $N_L$ layers such that each of the $N_L$ layers includes an approximately equal number of modulated symbols of each of the plurality of code blocks.

* * * * *